United States Patent [19]

Watanabe

[11] 4,439,124
[45] Mar. 27, 1984

[54] MACHINE FOR AUTOMATICALLY MAKING ROLLED FOOD PRODUCTS SUCH AS EGG ROLLS AND THE LIKE

[75] Inventor: Hidefumi Watanabe, Amagasaki, Japan

[73] Assignee: Daieigiken, Inc., Amagasaki, Japan

[21] Appl. No.: 280,065

[22] Filed: Jul. 2, 1981

[30] Foreign Application Priority Data

| Jul. 12, 1980 [JP] | Japan | 55-95519 |
| Jul. 12, 1980 [JP] | Japan | 55-95524 |
| Jul. 12, 1980 [JP] | Japan | 55-95520 |
| Jul. 12, 1980 [JP] | Japan | 55-95521 |
| Jul. 12, 1980 [JP] | Japan | 55-95522 |
| Jul. 12, 1980 [JP] | Japan | 55-95523 |

[51] Int. Cl.³ ............... B29C 17/00; B29D 3/00; A21C 9/06
[52] U.S. Cl. .................. 425/112; 99/450.6; 425/324.1; 425/383
[58] Field of Search ............ 425/112, 324.1, 383, 425/113; 99/450.6

[56] References Cited

U.S. PATENT DOCUMENTS

| 3,450,067 | 6/1969 | Kao | 425/112 |
| 3,633,517 | 8/1970 | Kao | 99/450.6 |
| 3,669,007 | 6/1972 | Pulici | 99/450.6 |
| 3,690,248 | 9/1972 | Schafer | 99/450.6 |
| 3,724,361 | 4/1973 | Schafer | 99/450.6 |
| 3,912,433 | 10/1975 | Ma | 99/450.6 |
| 3,930,440 | 1/1976 | Ohkawa | 99/450.6 |
| 3,946,656 | 3/1976 | Hai | 99/450.6 |
| 4,014,254 | 3/1977 | Ohkawa | 99/450.6 |
| 4,084,493 | 4/1978 | Quintana | 99/450.6 |
| 4,160,634 | 7/1979 | Huang | 425/112 |

Primary Examiner—Willard E. Hoag
Attorney, Agent, or Firm—Gabriel P. Katona

[57] ABSTRACT

There is disclosed a machine for automatically making rolled food products such as spring rolls, crepes or the like by rolling a food stuffing in a generally rectangular edible skin having first and second diagonally opposite corner areas and third and fourth diagonally opposite corner areas comprising a filling device for filling the food stuffing in the edible skin at a location on one side of the diagonal line of the shape of the skin adjacent the first corner area while the skin is placed on a support table. The machine also comprises a folding device effective to fold the first corner area of the skin, which has been filled with the food stuffing, so as to overlay the food stuffing and then turn backwards and also to fold the third and fourth corner area on respective sides of the food stuffing so as to overlay the food stuffing at a location opposite to the portion of the food stuffing where the first corner area has overlaid, and a rolling device for rolling the second corner area of the skin up around the food stuffing to complete the formation of the egg roll, spring roll, crepe or the like.

10 Claims, 24 Drawing Figures

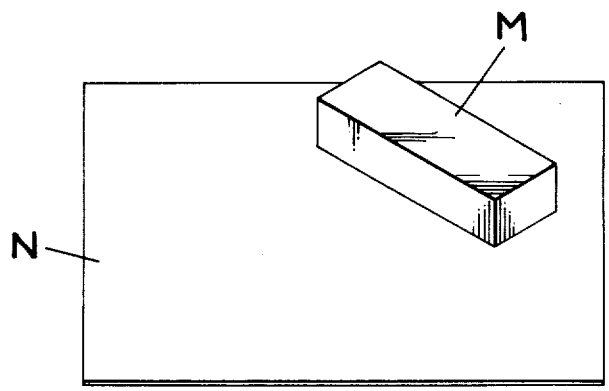
Fig. 1 (I)
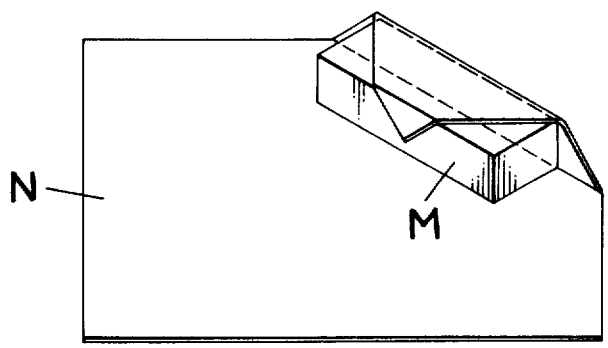
Fig. 1 (II)
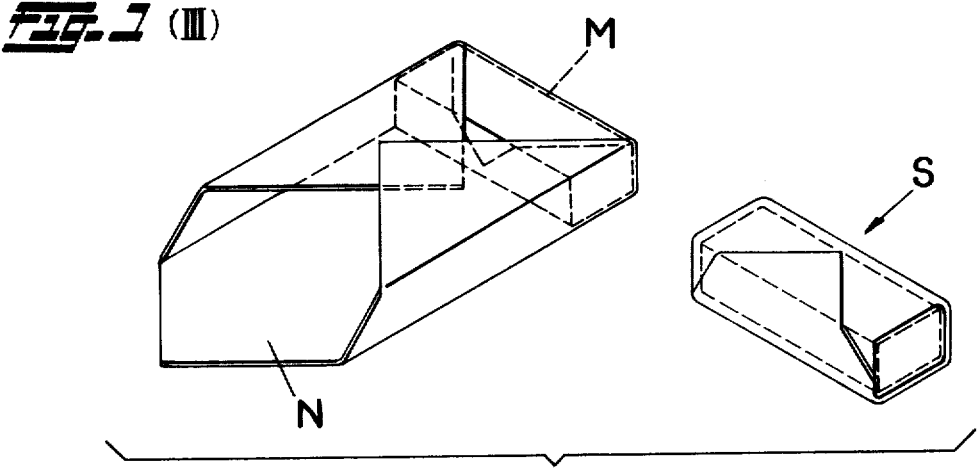
Fig. 1 (III)

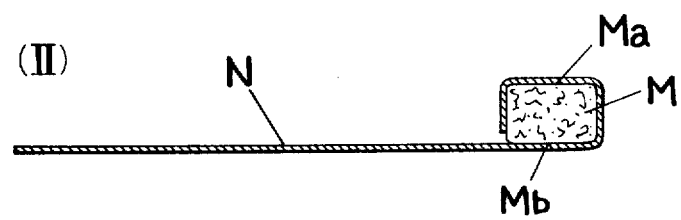
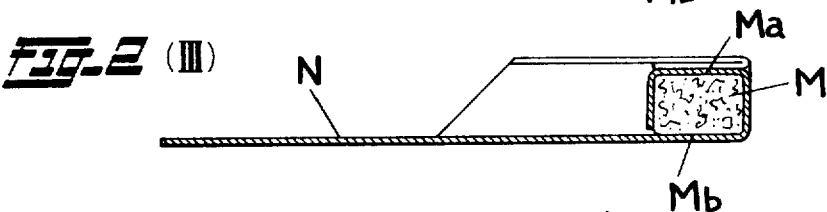
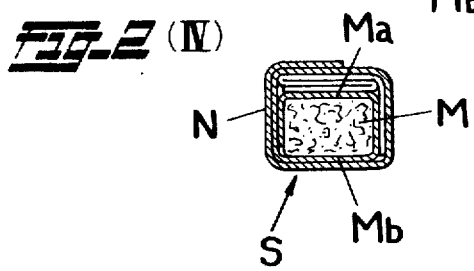

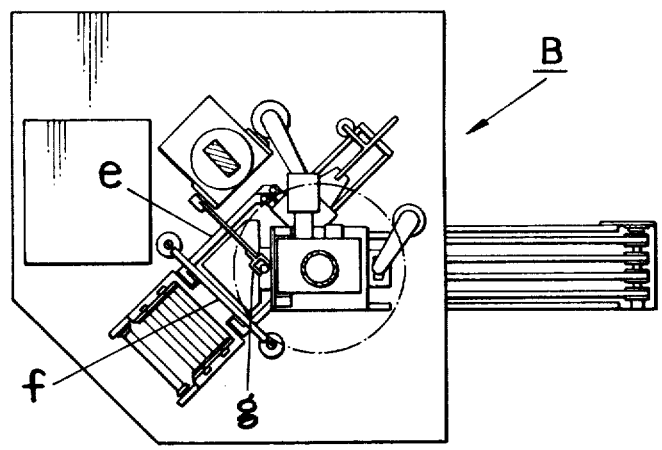
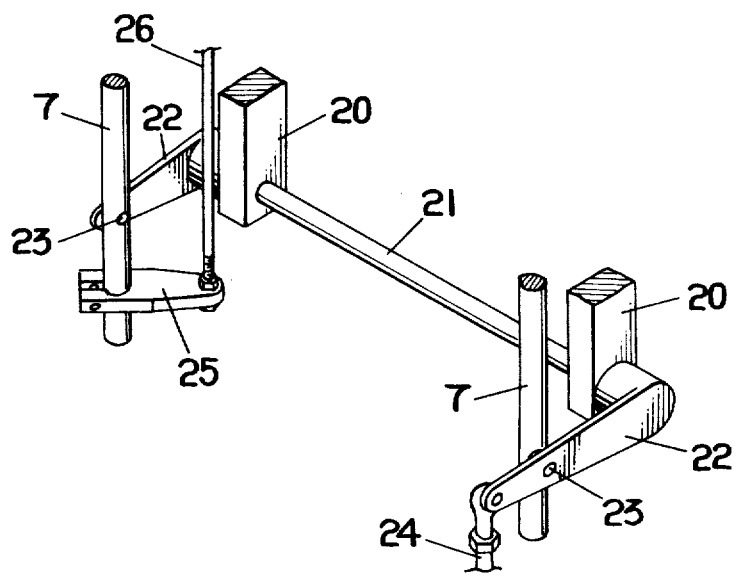

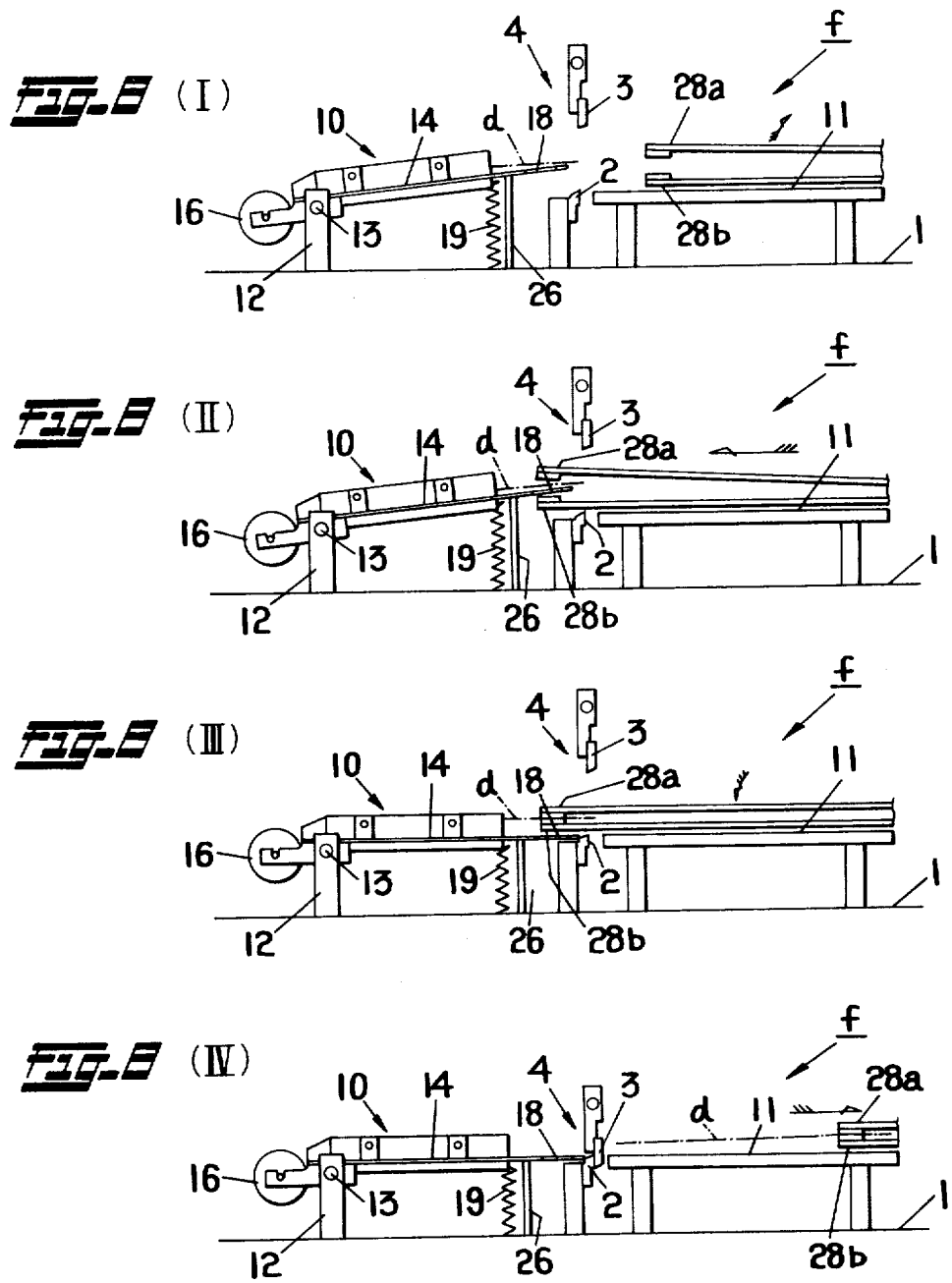

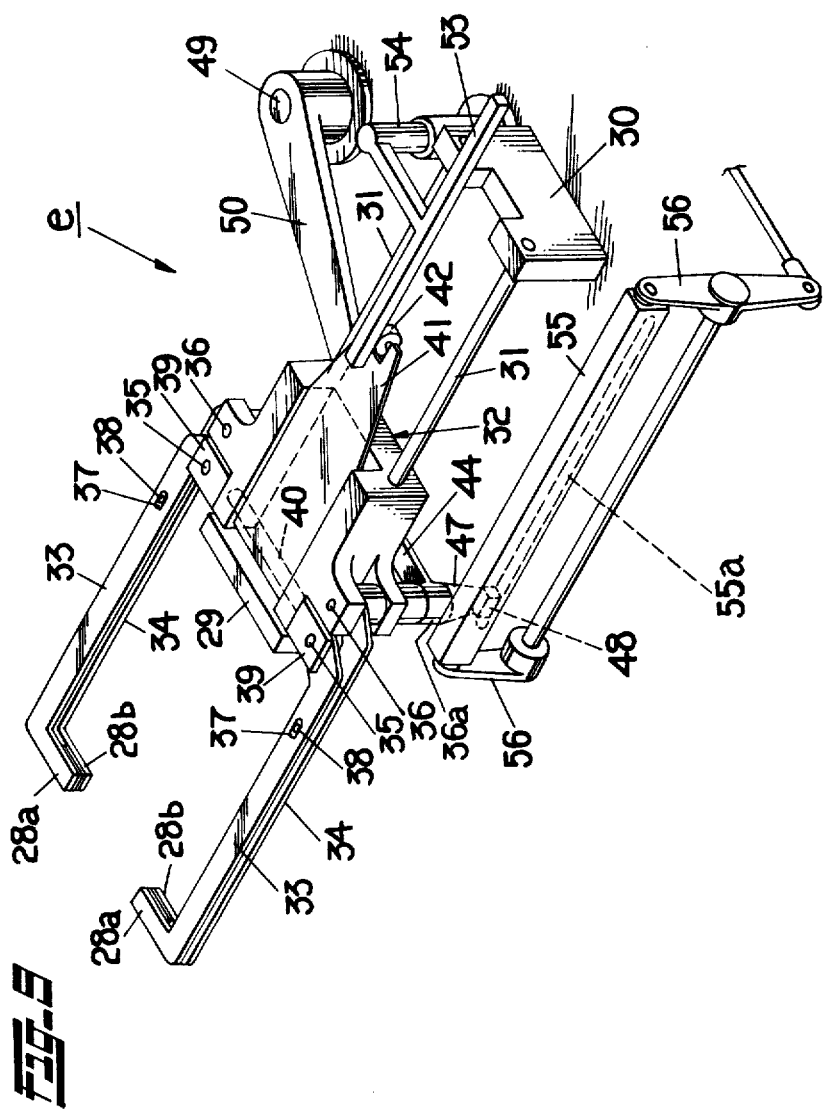

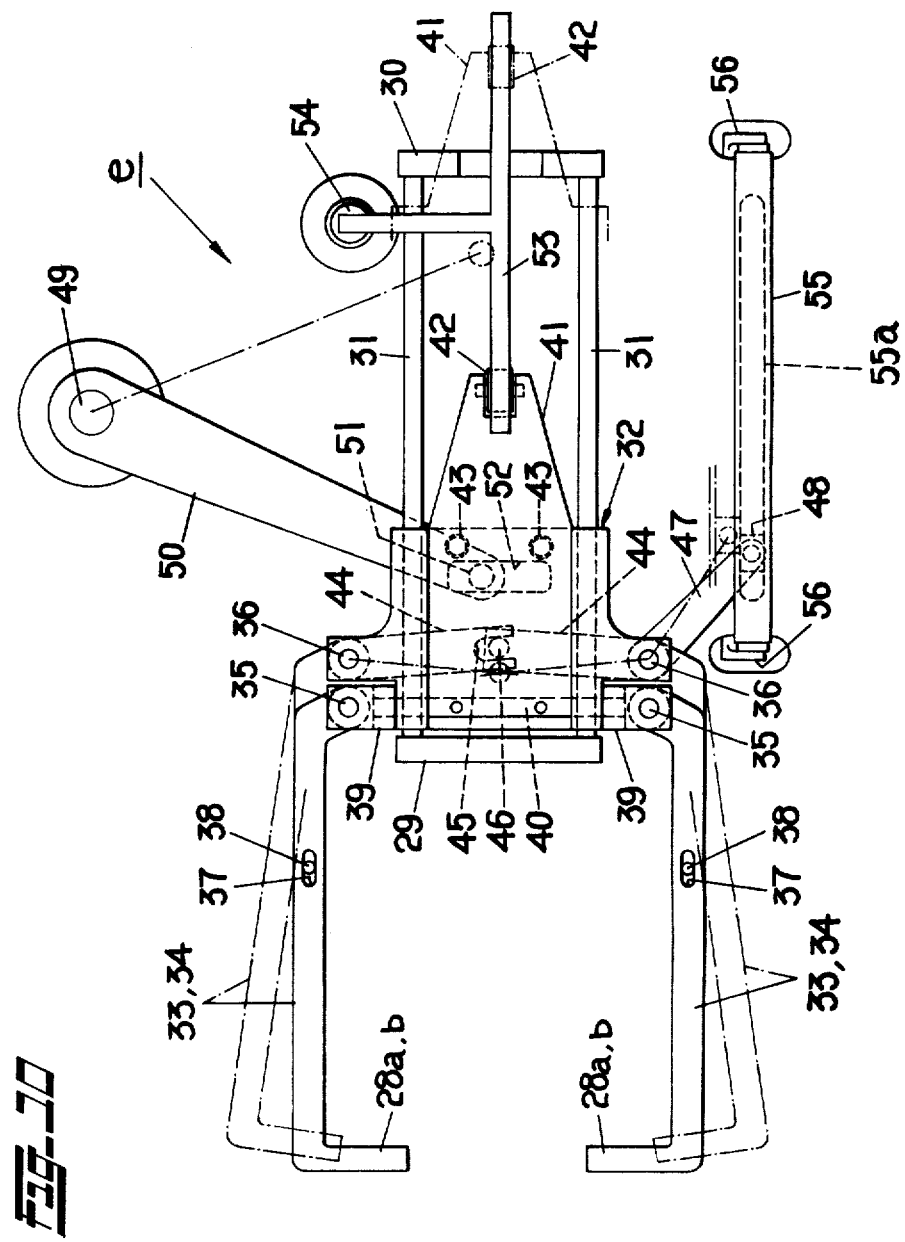

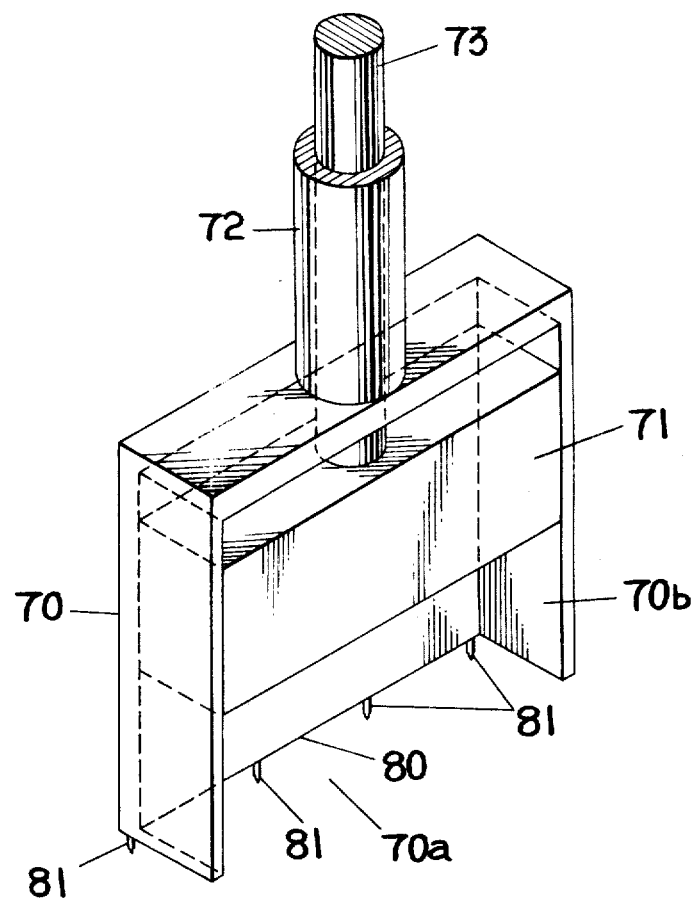

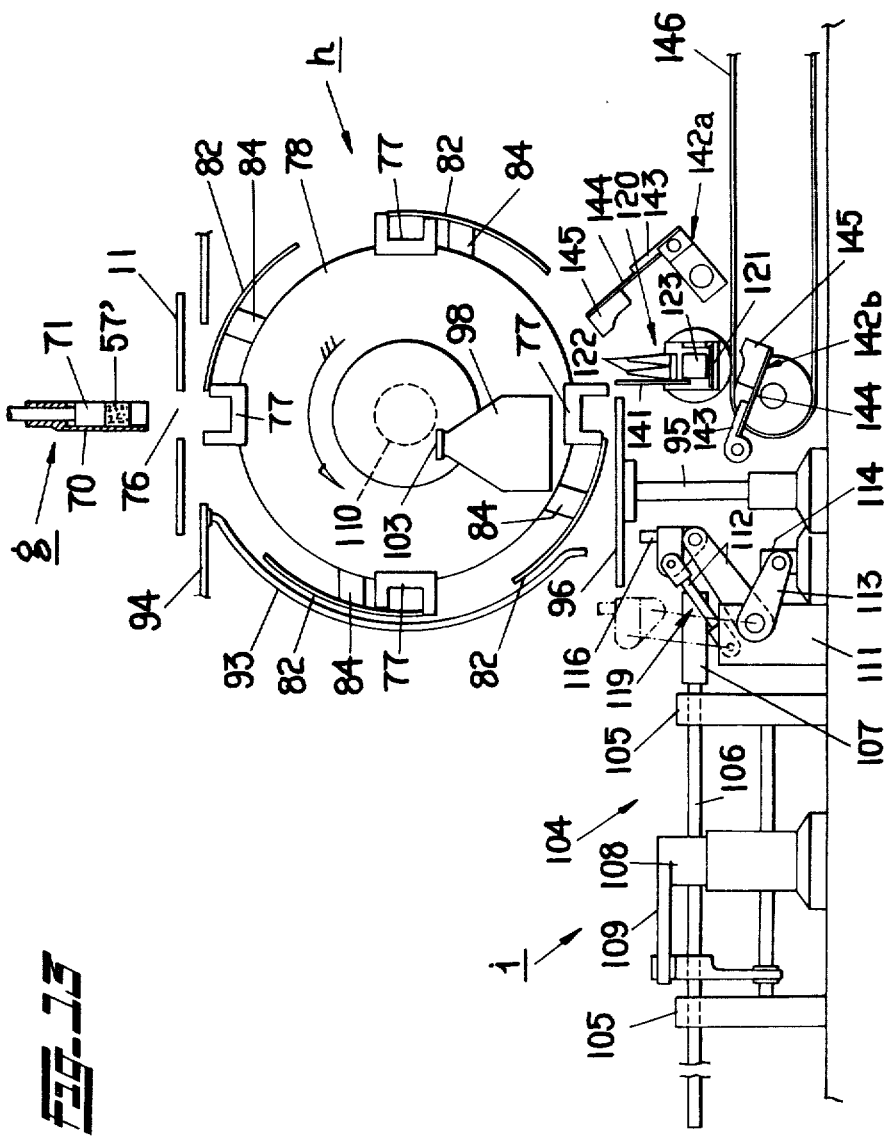

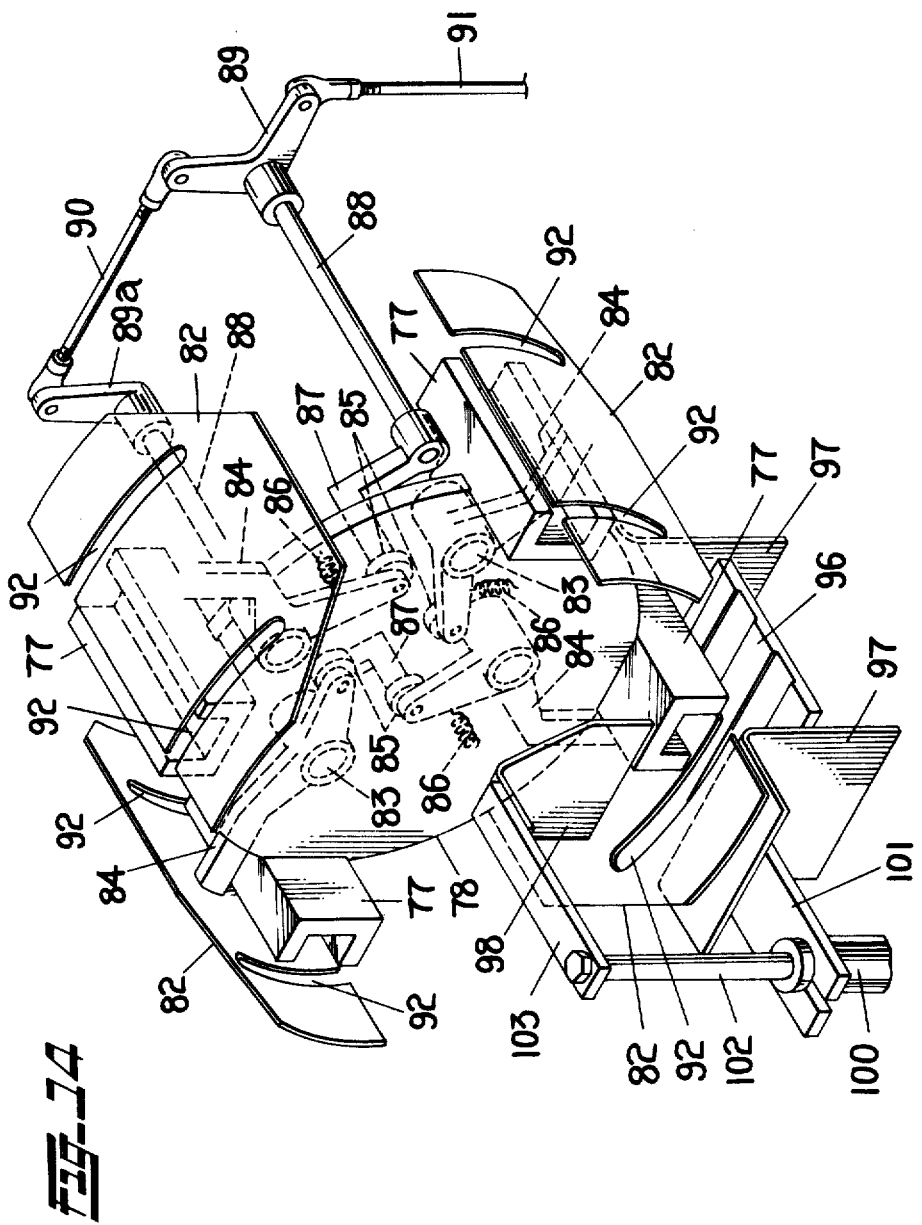

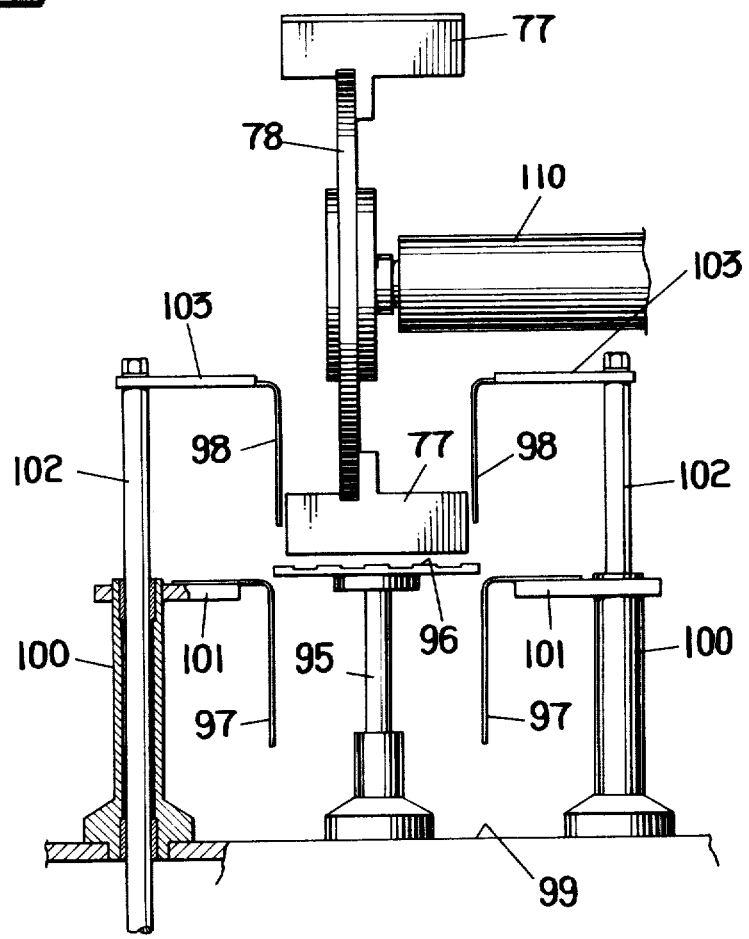

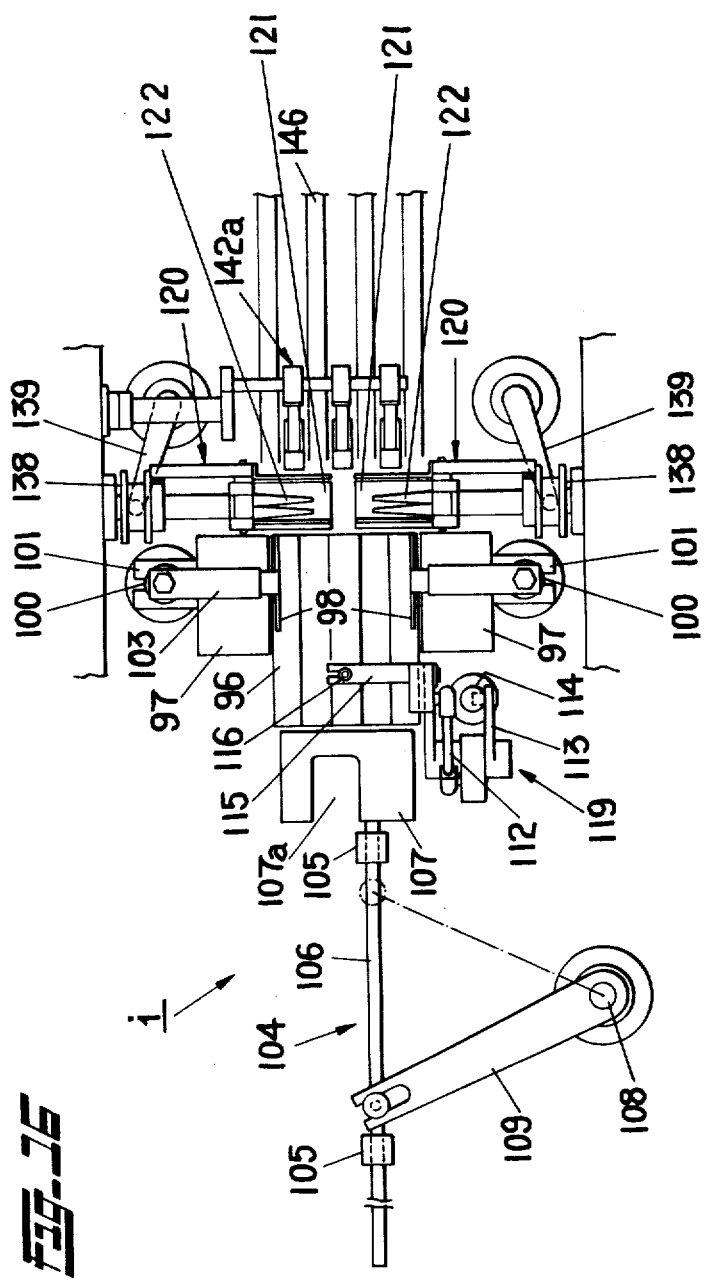

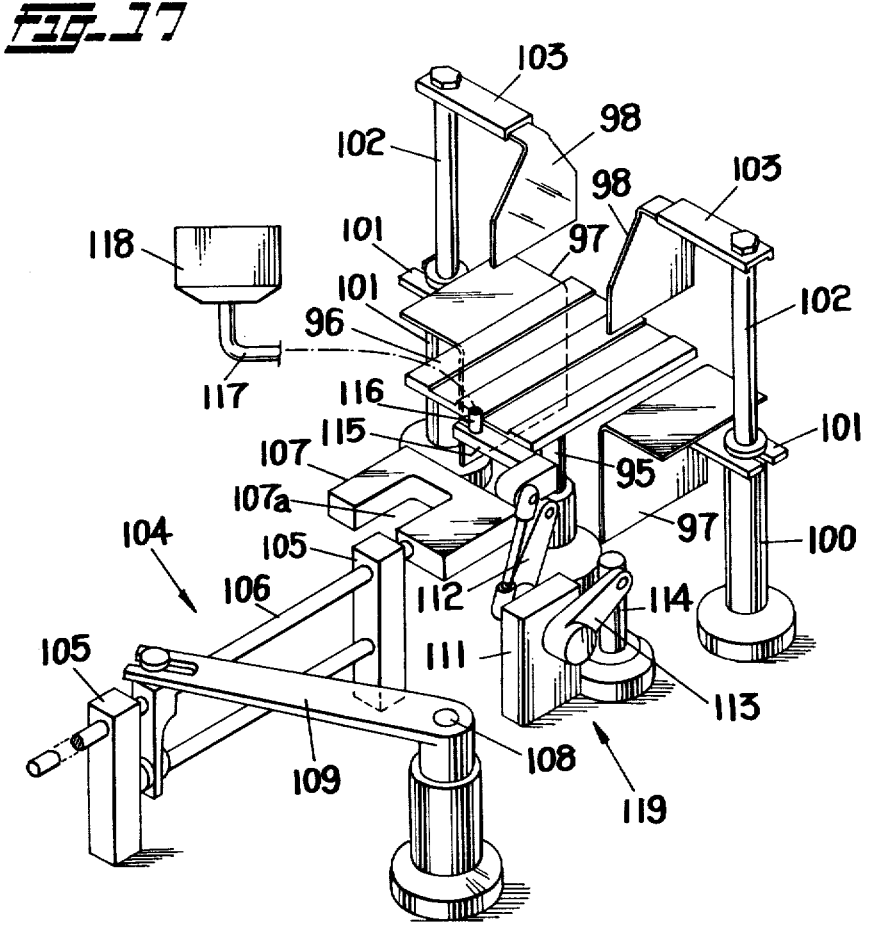

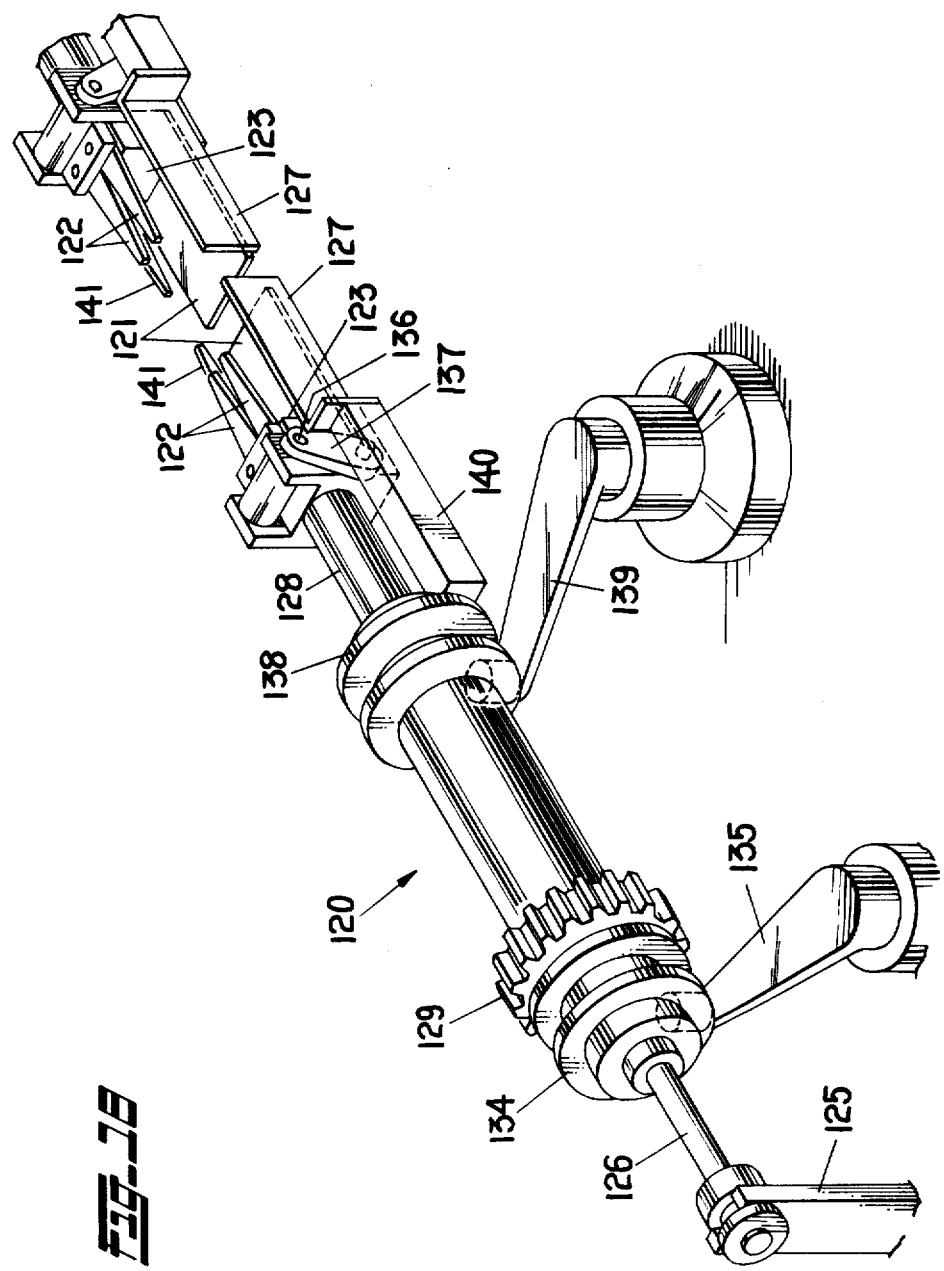

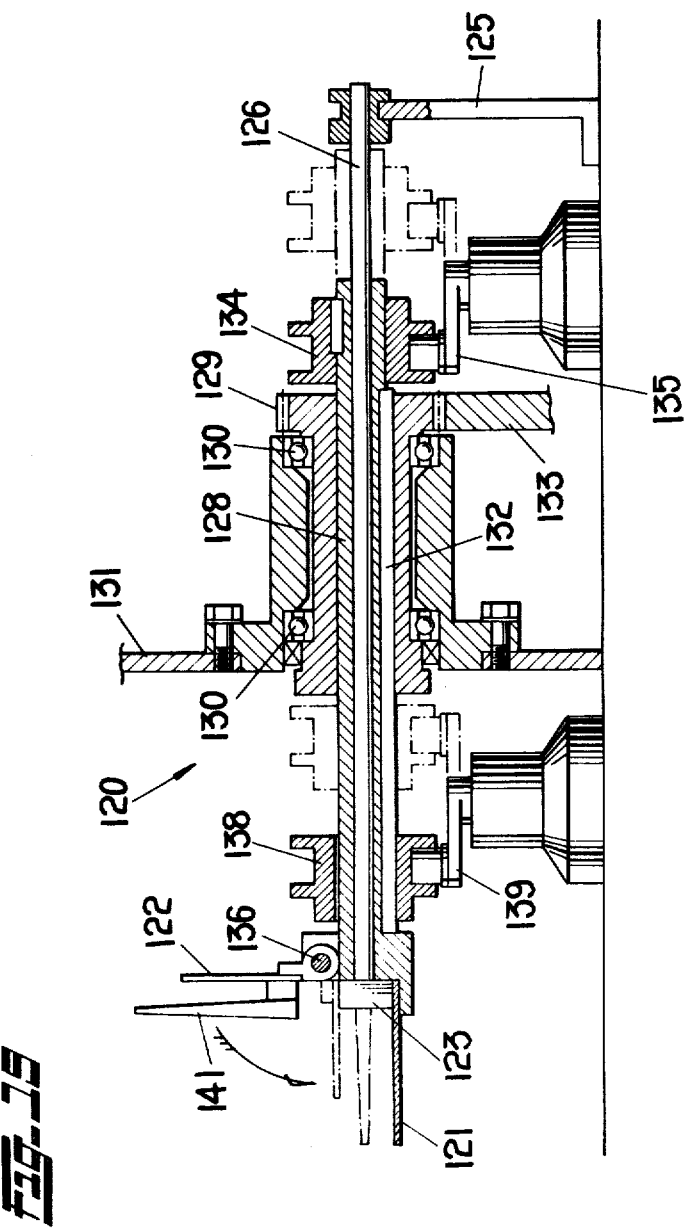

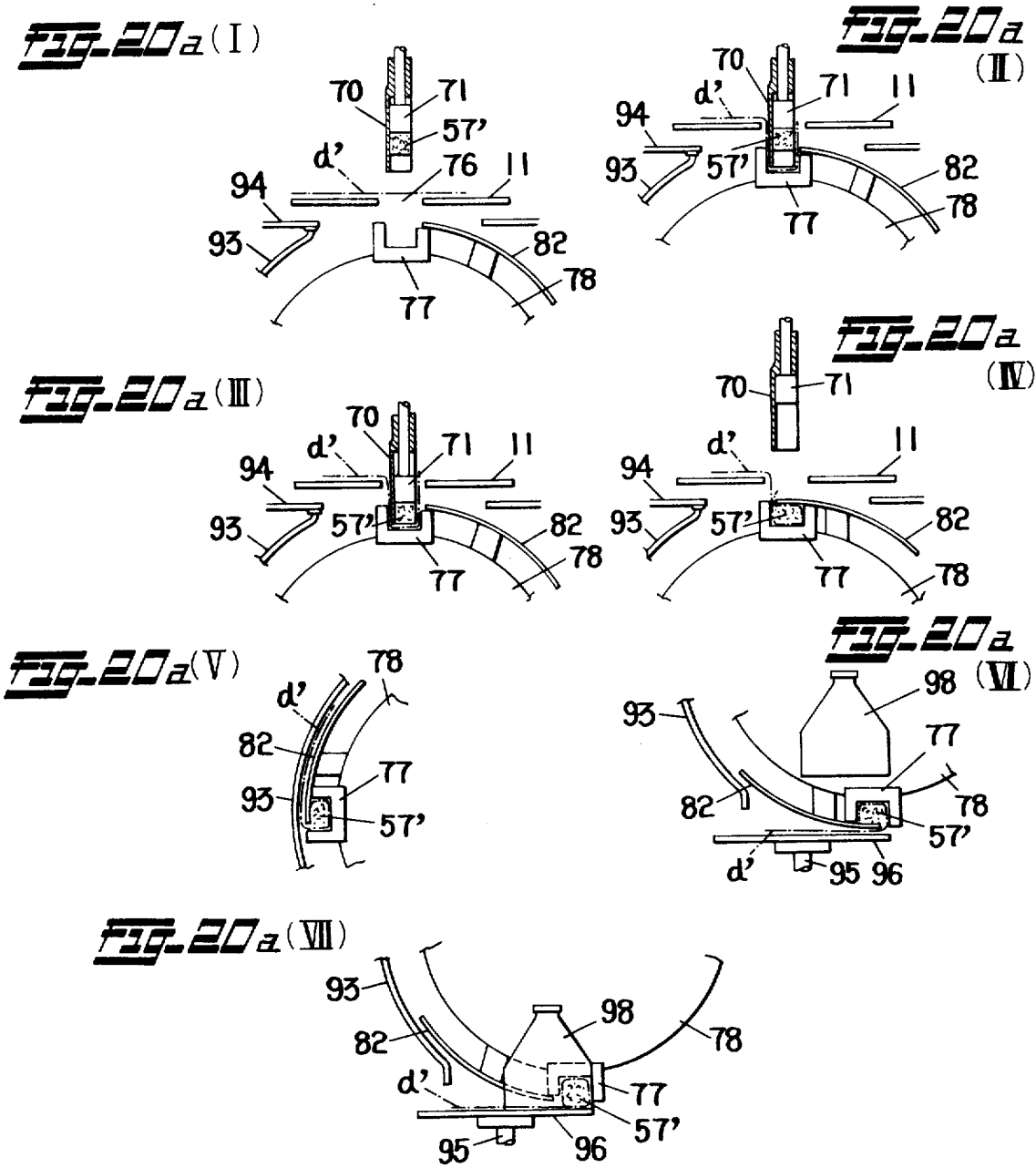

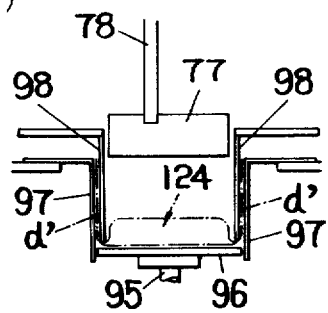
FIG.20b(VIII)
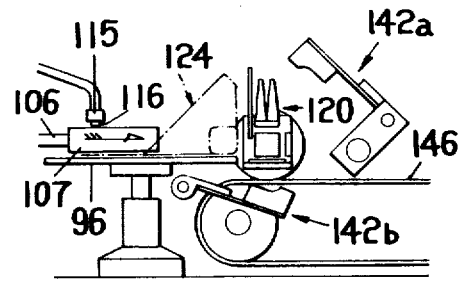
FIG.20b(IX)
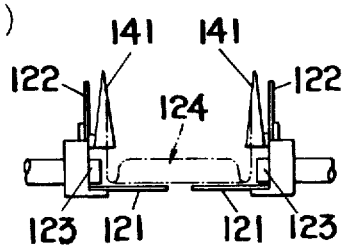
FIG.20b(X)
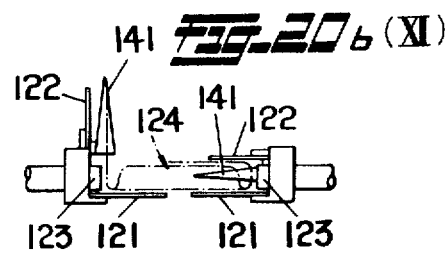
FIG.20b(XI)
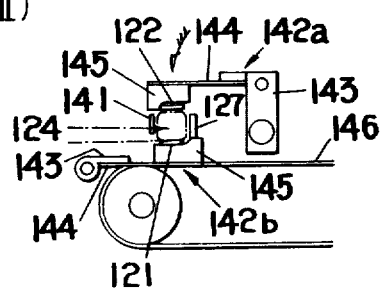
FIG.20b(XII)
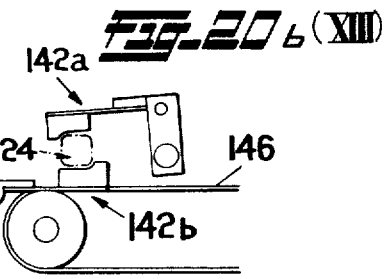
FIG.20b(XIII)
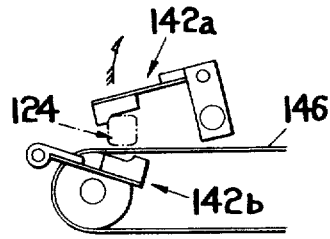
FIG.20b(XIV)

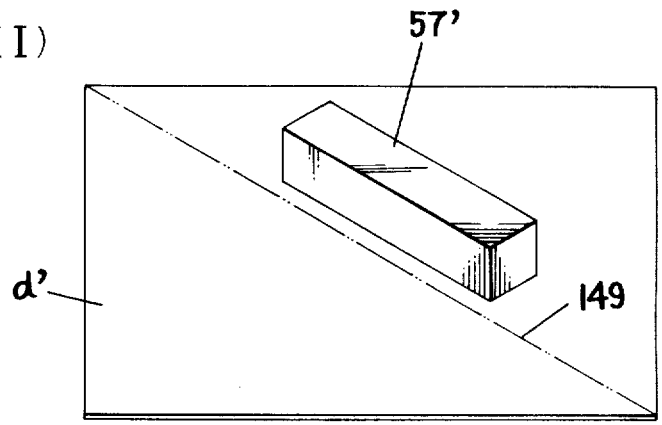
_Fig. 21a_ (I)
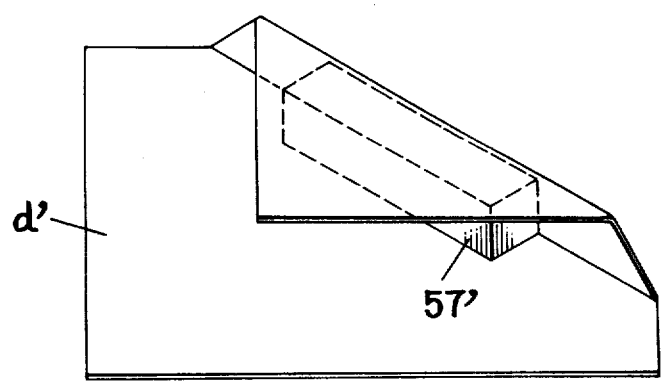
_Fig. 21a_ (II)

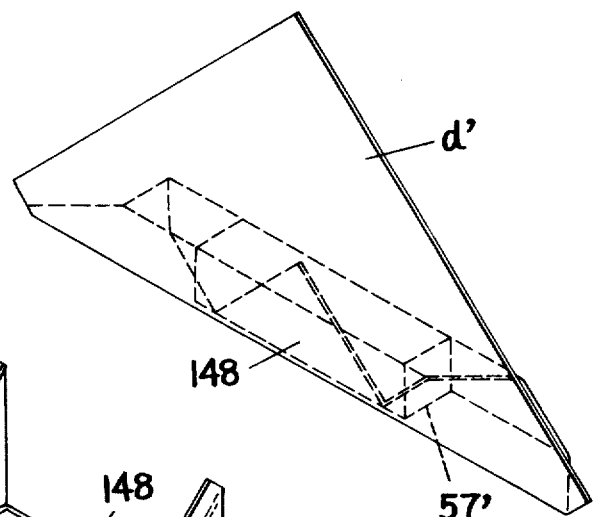
Fig.21b (III)
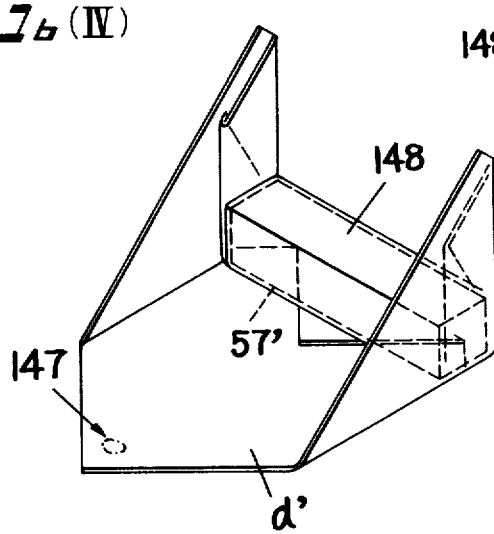
Fig.21b (IV)
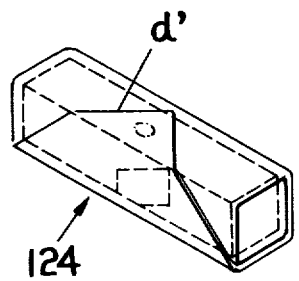
Fig.21b (VI)
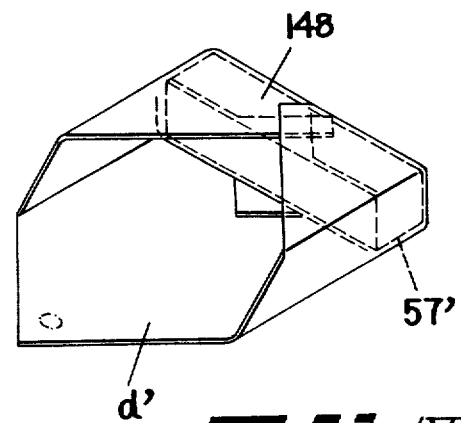
Fig.21b (V)

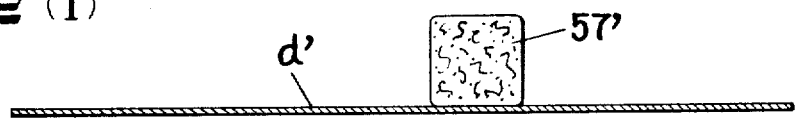
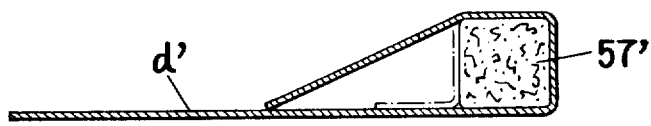
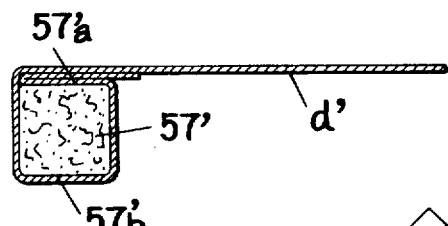
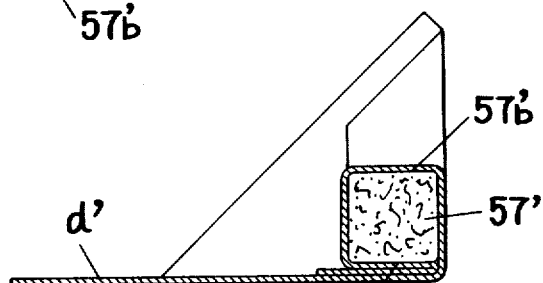
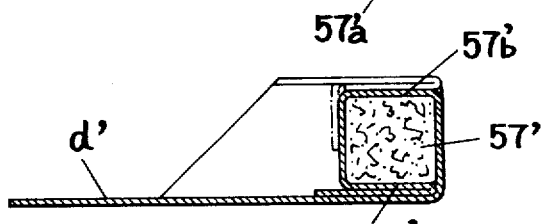
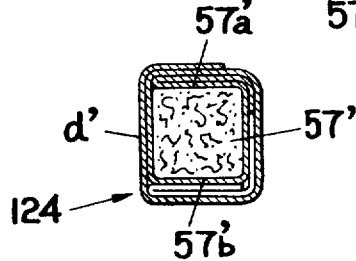

MACHINE FOR AUTOMATICALLY MAKING ROLLED FOOD PRODUCTS SUCH AS EGG ROLLS AND THE LIKE

BACKGROUND OF THE INVENTION

The present invention generally relates to a machine for automatically making rolled food products and, more particularly, to a machine for automatically making egg rolls, spring rolls which are each referred to as "Haru Maki (or Harumaki)" in Japan, crepes or the like. A "Harumaki" is known as a deep fried pastry made by wrapping an assorted food stuffing, for example, a seasoned mixture of vegetables and ground pork, in the form of a roll with a generally rectangular crepe or egg roll skin prepared from a mixture of egg and wheat flour, and then by deep frying the resultant rolled product.

FIG. 1 of the accompanying drawings illustrates the sequence of formation of rolled food products according to the conventional method, and reference will now be made thereto for the details thereof.

Referring to FIG. 1, there is shown a generally rectangular crepe or egg roll skin prepared by lightly baking a paste of egg and wheat flour on a heated iron plate or the like and having first and second diagonally opposite corner portions and third and fourth diagonally opposite corner portions, as generally indicated by N. In the first step as shown in FIG. 1(I), an assorted food stuffing M is placed on the crepe N at a position somewhat offset from the center thereof and adjacent, for example, the first corner portion and, thereafter, the first corner portion of the crepe N is folded so as to overlay the assorted food stuffing M as shown in FIG. 1(II). Subsequently, the third and fourth corner portions of the crepe N are successively folded, as shown in FIG. 1(III), so as to overlap with each other above a central area of the crepe N and also to overlay the opposite end portions of the assorted food stuffing M and, finally, the assorted food stuffing M so wrapped halfway is rolled up with the second corner portion of the crepe N bonded to the rolled body as shown in FIG. 1(IV), thereby completely the raw egg roll.

While FIGS. 1(I) to 1(IV) illustrate in perspective view of the material being prepared sequentially to form the raw egg roll, the material being so prepared is shown in cross sectional view in FIG. 2, wherein FIGS. 2(I) to 2(IV) correspond respectively to FIGS. 1(I) to 1(IV). As can readily be understood from FIG. 2, the assorted food stuffing M is wrapped at a portion Ma with a larger number of overlaps of portions of the crepe N than at the opposite portion Mb thereof. This means that the assorted food stuffing M cannot be uniformly wrapped having a thicker covering of the crepe N adjacent the portion Ma thereof than adjacent the portion Mb. Accordingly, when the raw egg roll so formed in subsequently subjected to a deep frying process or a baking process, uniform heating of the egg roll is often hampered. Specifically, because transmission of heat energies towards the food stuffing M through the thicker covering of the crepe N adjacent the portion Ma of the food stuffing M requires a longer time than through the thinner covering of the crepe N adjacent the portion Mb of the food stuffing M, it has often occurred that the portion Ma of the food stuffing M is left uncooked.

SUMMARY OF THE INVENTION

Accordingly, the present invention has been developed with a view to substantially eliminating the above described disadvantages and inconveniences and has for its essential object to provide an improved machine for automatically making the rolled food product such as the egg roll, spring roll, crepe or the like.

Another important object of the present invention is to provide an improved machine for making rolled food products such as egg rolls, spring rolls, crepes or the like of the type referred to above, which is effective to roll up the food stuffing without the food stuffing being displaced from a correct position relative to the crepe used to wrap the food stuffing.

A further object of the present invention is to provide an improved machine for making rolled food products such as egg rolls, spring rolls, crepes or the like, of the type referred to above, which is effective to form the products with the food stuffing closely packed, which products are capable of retaining their shape for a prolonged period of time.

BRIEF DESCRIPTION OF THE DRAWINGS

These and other objects and features of the present invention will become apparent from the following description taken in conjunction with a preferred embodiment thereof with reference to the accompanying drawings, in which:

FIGS. 1(I) to 1(IV) are perspective views showing the sequence of formation of an egg roll according to the conventional method;

FIGS. 2(I) to 2(IV) are side sectional views showing the sequence of formation of the egg roll according to the conventional method in correspondence with FIGS. 1(I) to 1(IV), respectively;

FIG. 4 is a schematic top plan view of the egg roll and spring roll making apparatus shown in FIG. 3;

FIG. 7 is a perspective view of a drive unit for the crepe cutting unit;

FIGS. 8(I) to 8(IV) are schematic side views showing the sequence of cutting of a continuous web of crepe into crepes or egg roll skins or spring roll skins of definite shape;

FIG. 9 is a perspective view, on an enlarged scale, of a crepe positioning unit used in the egg roll or spring roll making apparatus;

FIG. 10 is a top plan view of FIG. 9;

FIG. 12 is a perspective view, on a further enlarged scale, of a shaping cylinder device used in the egg roll and spring roll making apparatus;

FIG. 13 is a schematic front elevational view of an essential portion of the machine for making rolled food products showing an arrangement of a food stuffing filling device, a crepe folding device and a rolling device in operatively associated relation;

FIG. 14 is a perspective view, on a somewhat enlarged scale, of a rotary filling drum used in the food stuffing filling device shown in FIG. 13;

FIG. 15 is a side elevational view showing a food receptacle and its associated parts used in the device of FIG. 13;

FIG. 16 is a top plan view of FIG. 13, with the filling drum removed away;

FIG. 17 is a perspective view of a bond applicator shown together with a pusher in relation to the food receptacle;

FIG. 18 is a perspective view of the rolling device shown on an enlarged scale;

FIG. 19 is a longitudinal sectional view of the rolling device shown in FIG. 18;

FIGS. 20(I) to 20(XIV) are side views of a portion of the device shown in FIG. 13, showing the sequence of operation thereof;

FIGS. 21(I) to 21(VI) are perspective views showing the sequence of formation of a rolled food product performed by the apparatus embodying the present invention; and FIGS. 22(I) to 22(VI) are side sectional views showing the sequence of formation of a rolled food product performed by the apparatus of the present invention, which views correspond respectively to FIGS. 21(I) to 21(VI).

DETAILED DESCRIPTION OF THE EMBODIMENT

Figure 3:
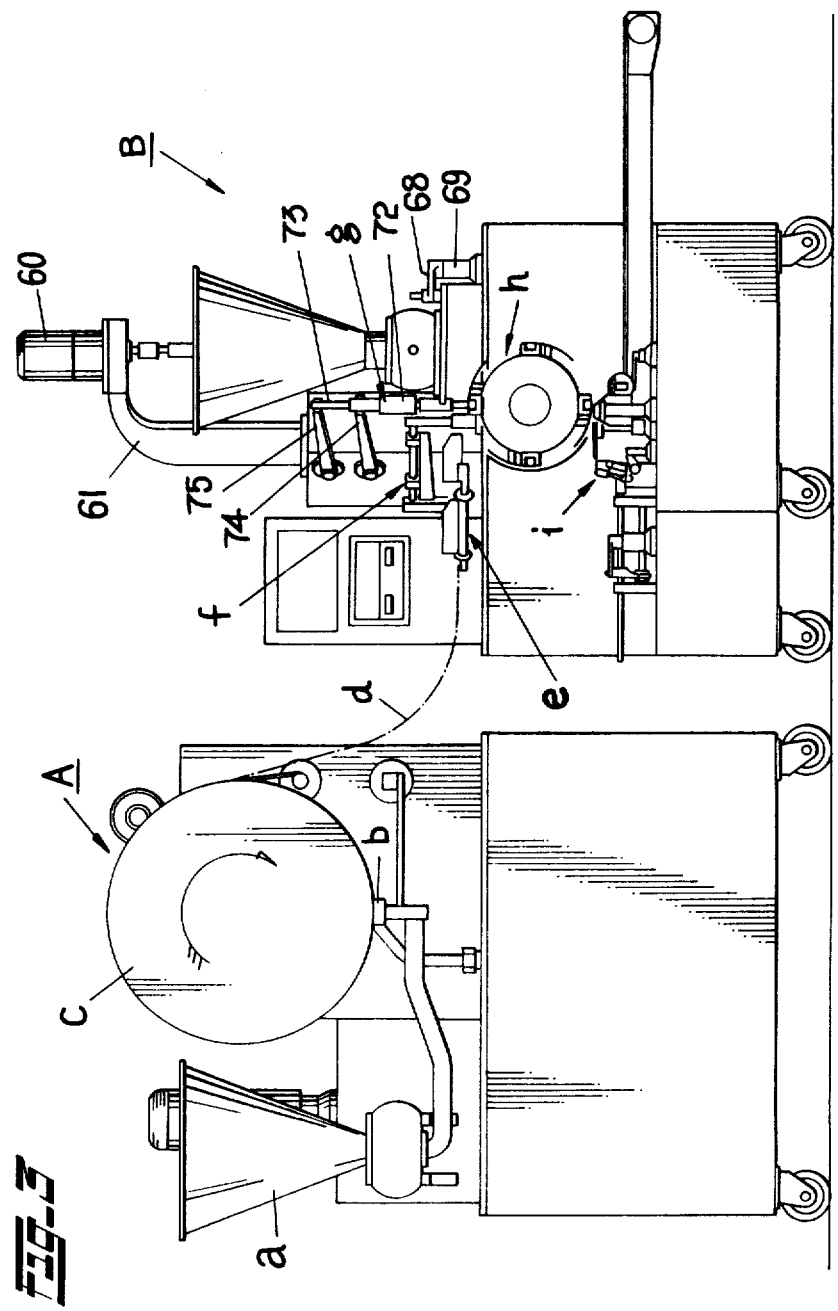
FIG. 3 is a schematic front elevational view of an entire in-line system for making rolled food products including both a crepe making apparatus and an egg roll and spring roll making apparatus.

Referring first to FIG. 3, there is shown an entire system necessary to perform a whole process of preparing a continuous web or band of egg roll skin, spring roll skin, or crepe, cutting the crepe band into crepes of generally rectangular shape, filling an assorted food stuffing in each of the crepes and rolling up the food stuffing in the crepe. The system shown therein comprises a crepe making apparatus, generally indicated by A, for continuously forming the web or band d of crepe from a paste of egg and wheat flour, and a machine for making a rolled food product, generally indicated by B.

The crepe making apparatus A so far shown comprises a food stuffing supply hopper a, a generally slit-shaped supply nozzle b fluid-coupled to the bottom of the supply hopper a in any known manner, and a heating drum c supported for rotation in one direction and positioned immediately above the supply nozzle b and is so designed that, during rotation of the heating drum c while the paste of egg and wheat flour is continuously supplied from the hopper a onto the outer periphery of the heating drum c, the paste is lightly baked in contact with the heating drum c to form the web of crepe as shown by d, which web of crepe leaves from the heating drum c at a position angularly spaced from where the supply nozzle b is located.

The present invention pertains to the machine B for making rolled food products and this machine B comprises a positioning device e for drawing the crepe web d so formed by the crepe making apparatus A to a predetermined filling position, a cutting unit f for cutting the crepe web d into generally rectangular crepes d' of predetermined dimensions, a filling unit g for filling a predetermined amount of assorted food stuffing in the rectangular crepes one at a time, a crepe folding device h for folding the rectangular crepe so as to wrap the filled food stuffing, and a rolling device i for rolling up the filled food stuffing in the corresponding crepe d' to complete the formation of the egg roll either ready to be served on a dining table or ready to be deep fried. Of these components of the machine, the filling unit g, the crepe folding device h and the rolling device i are particularly important to the present invention.

Figure 5:
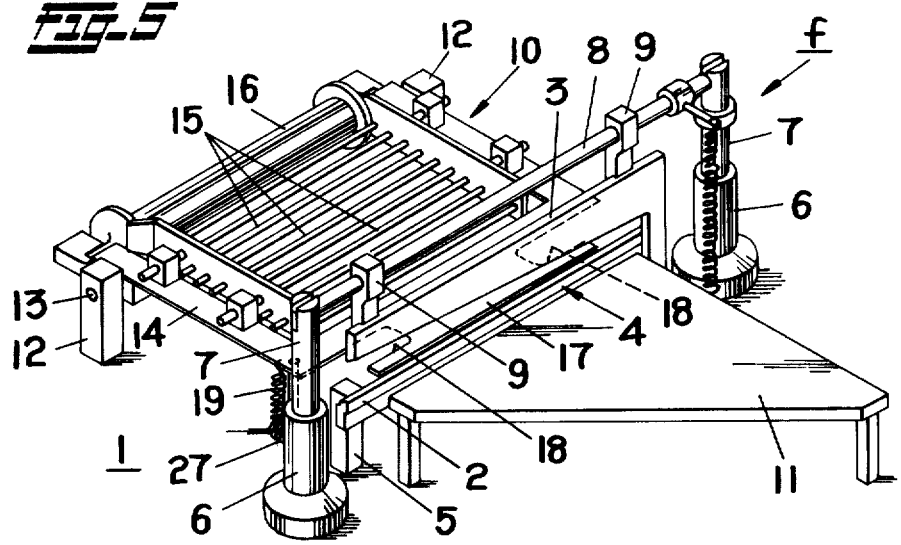
FIG. 5 is a perspective view, on an enlarged scale, of a crepe cutting unit used in the egg roll and spring roll making apparatus shown in FIG. 3.
Figure 6:
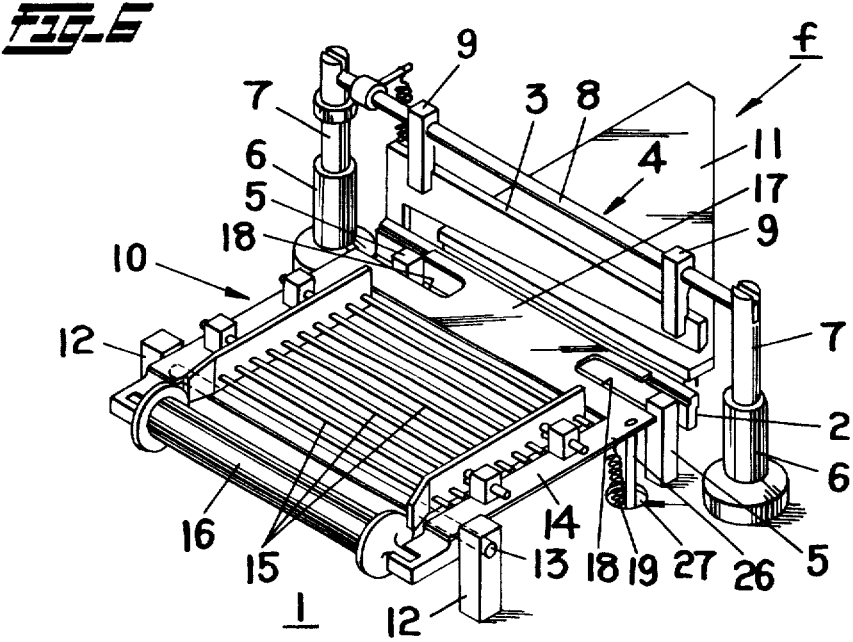
FIG. 6 is a view similar to FIG. 5, showing the crepe cutting unit as viewed in a direction different from FIG. 5.

As shown in FIGS. 5 and 6, the cutting unit f comprises a cutter means 4 including upper and lower cutter blades 2 and 3 cooperative with each other and supported above a bench 1, said lower cutter blade 2 being fixed relative to the bench 1 by means of a pair of spaced support posts 5 to which the opposite ends of said blade 2 are respectively secured. A pair of hollow guide posts 6 are rigidly mounted on the bench 1 at respective positions externally of the adjacent support posts 5 and in register with respective holes (not shown) defined in the bench 1 and have respective telescopically movable support rods 7 axially movably received in the hollow guide posts 6. These movable support rods 7 are connected to each other by means of a transverse bar 8 having its opposite ends rigidly connected to the respective free ends of the movable support rods 7 and extending in parallel relation to the lower cutter blade 2. The upper cutter blade 3 is supported from the transverse bar 8 by means of a pair of spaced hangers 9 so as to form a guillotine type cutter means 4 in cooperation with the lower cutter blade 2.

Arranged on respective sides of the cutter means 4 are a crepe receiving table 10 adjacent the crepe making machine A and a filling table 11 remote from the crepe making machine A, both of said receiving and filling tables 10 and 11 being supported above the bench 1. The crepe receiving table 10 is movably supported by means of a hinge shaft 13 having its opposite end portions journalled respectively to support posts 12 located at a position remote from the cutter means 4. The table 10 comprises a frame member 14 of generally U-shaped configuration having a plurality of equally spaced parallel bars 15 of circular cross-section and also an elongated idler roller 16 on one side of the bars 15 remote from the cutter means 4, both of said bars 15 and idler roller 16 extending in parallel relation to the cutter blades 2 and 3. In U-shaped frame member 14 also has a generally T-shaped projection 17 protruding outwards from a portion of the frame member 14 corresponding to the bottom of a figure "U" with a pair of engagement notches defined at 18. It is to be noted that a free edge of the T-shaped projection 17 corresponding to the top of a figure "T" is engaged to and held in contact with a upper knife edge of the lower cutter blade 2 when and so long as the crepe receiving table 10 is held in a horizontal position by the action of a tension spring 19 interposed between the other end of the table 10 and the bench 1.

The upper cutter blade 3 so supported above the lower cutter blade 2 in the manner described above is movable in a direction close towards and away from the lower cutter blade 2 by means of a drive unit positioned underneath the bench 1 in a manner as will now be described with reference to FIG. 7. As shown in FIG. 7, a pair of spaced bearing members 20 extend downwards from the bench 1 and carries a connecting rod 21 having its opposite ends rotatably extending through respective lower end portions of the bearing members 20. The movable support rods 7 are operatively coupled to the connecting rod 21 by means of respective levers 22 of different length, the shorter lever 22 having its opposite ends connected rigidly to one end of the connecting rod 21 and pivotally to the support rod 7 while the longer lever 22 has one end rigidly connected to the other end of the connecting rod 21 and the other end pivotally coupled to a drive rod 24, a substantially intermediate portion of said longer lever 22 being pivotally connected to the support rod. The respective points of pivotal connection of the levers 22 to the associated support rods 7 are generally identified by 23.

The pivotal movement of the crepe receiving table 10 between the horizontal position and a tilted position about the hinge shaft 13 (FIGS. 5 and 6) is synchronized with the movement of the upper cutter blade 3 in the direction towards and away from the lower cutter blade 2. For this purpose, the crepe receiving table 10 is operatively associated with one of the movable support rods 7 adjacent the shorter lever 22 by means of a shifting rod 26 having its upper end contacting the undersurface of the U-shaped frame member 14 of the crepe receiving table 10 and its lower end connected to the movable support rod 7 through a connecting bracket 25, a substantially intermediate portion of said shifting rod 26 extending slidably through a hole 27 defined in the bench 1 as shown in FIGS. 5 and 6.

The drive rod 24 is in turn operatively coupled to any known drive mechanism through a cam mechanism (not shown) so designed as to reciprocately move the drive rod 24 in a vertical direction transversely of the direction of movement of the upper cutter blade 3 towards and away from the lower cutter blade 2.

The cutting unit f of the construction described above is operable in the following manner. Referring to FIGS. 5 to 7 in combination with FIGS. 8(I) to 8(IV), assuming that the leading end of the crepe web d with respect to the direction of feed thereof towards the machine B has passed through the clearance between the lower and upper cutter blades 2 and 3 and positioned above the crepe filling table 11 at the outset of the operation of the cutter unit f, a portion of the crepe web d rearwardly of the cutter means 4 with respect to the direction of feed of the crepe web is supported above the parallel bars 15 while the crepe receiving table 10 is held in the tilted position as shown in FIG. 8(I). At the same time, the upper cutter blade 3 is held in an inoperative position separated away from the lower cutter blade 2 with the clearance defined therebetween because the drive rod 24 is upwardly shifted with the levers 22 consequently pivoted clockwise about the connecting rod 24 as viewed in FIG. 7 thereby upwardly shifting the support rods 7 together with the shifting rod 26.

While the crepe receiving table 10 and the upper cutter blade 3 are so positioned as hereinabove described and shown in FIG. 8(I), a gripper assembly forming a part of the crepe positioning device e and comprised of two spaced gripper pairs 28a and 28b, the details of which will be described later, is moved from a retracted position above the filling table 11 towards a projected position above the crepe receiving table 10. During the movement of the gripper assembly from the retracted position towards the projected position, the grippers 28a and 28b of each pair are spaced from each other and, at the same time, the pairs of the grippers 28a and 28b are pivoted in a direction away from each other in a manner as will be described later.

As soon as the gripper assembly is brought to the projected position with the pairs of the grippers 28a and 28b situated above the crepe receiving table 10 as shown in FIG. 8(II), the pairs of the grippers 28a and 28b are pivoted in a direction towards each other and the grippers 28a and 28b of each pair are subsequently moved to clamp the opposite lateral edges of that portion of the crepe web d rearwardly of the cutter means 4 as shown in FIG. 8(III). This is possible because the pairs of the grippers 28a and 28b being pivoted in the direction towards each other are permitted to enter the engagement notches 18, respectively, while the grippers 28a and 28b of each pair are spaced from each other in readiness for clamping the corresponding lateral edge of that portion of the crepe web d and because the crepe receiving table 10 is held in the tilted position to permit the spaced grippers 28a and 28b of each pair to receive the corresponding lateral edge of that portion of the crepe web d therebetween at the time of completion of the movement of the pairs of the grippers 28a and 28b in the direction towards each other.

Immediately after and in response to the clamping of the lateral edges of the portion of the crepe web d performed by the pairs of the grippers 28a and 28b in the manner as hereinabove described, the drive rod 24 is lowered with the levers 22 consequently rotating counterclockwise as viewed in FIG. 7 about the connection rod 21, thereby permitting the movable support rods 7 and the shifting rod 26 to descend. As the shifting rod 26 descends, the crepe receiving table 10 is pivoted back towards the horizontal position whereas the descent of the support rods 7 permits the upper cutter blade 3 to move towards the lower cutter blade 2 to cut the crepe web d to provide a generally rectangular crepe d' as shown in FIG. 8(IV).

It is to be noted that, as can readily be understood from the sequence of the steps of the cutting process shown respectively in FIGS. 8(III) and 8(IV), the time at which the actual cutting of the crepe web d to provide the rectangular crepe d' takes place after the crepe receiving table 10 has been pivoted to the horizontal position and the gripper assembly has been moved from the projected position back towards the retracted position past the clearance between the upper and lower cutter blades 3 and 2. It is also to be noted that, during the pivotal movement of the crepe receiving table 10 from the tilted position back towards the horizontal position as pulled by the tension spring 19 with the shifting rod 26 descending, the T-shaped projection 17 allows the grippers 28b of the respective pairs, which have been positioned below the table 10 when the latter was in the tilted position, to pass through the associated engagement notches 18 relative to the crepe receiving table 10 being pivoted towards the horizontal position.

The timed operation of the cutter unit f in relation to both of the crepe receiving table 10 and the gripper assembly in the manner described hereinbefore can be achieved by suitably designing the cam mechanism for driving the drive rod 24 in such a way as to permit the crepe receiving table 10 to return to the horizontal position during a first stage of descent or lowering of the drive rod 24 and as to permit the upper cutter blade 3 to subsequently descend towards the lower cutter blade 2 during a second stage of lowering of the drive rod 24.

By so doing, the continuous crepe web d formed by and supplied from the crepe making apparatus A is intermittently cut into a plurality of separate rectangular crepes d' which are placed on the filling table 11 one at a time. Specifically, the movement of the gripper assembly from the projected position back towards the retracted position with the grippers 28a and 28b of the respective pairs clamping the corresponding lateral edge of that portion of the crepe web d draws the continuous crepe web d towards the filling table 11 in timed relation to the rotation of the heating drum c shown in FIG. 3.

Since the cutting unit f is so designed that, when the continuous crepe web d is to be drawn a predetermined distance onto the filling table 11, the crepe receiving table 10 is pivoted a slight angular distance from the horizontal position towards the tilted position shortly before the start of movement of the gripper assembly from the retracted position towards the projected position and that the crepe receiving table 10 is pivoted from the tilted position back towards the horizontal position subsequent to the clamping of the lateral edges of that portion of the continuous crepe web d by the pairs of the grippers 28a and 28b. The pairs of the grippers 28a and 28b can, with no failure, clamp the lateral edges of that portion of the crepe web d rearwardly of the cutter means 4 from the opposite directions towards the crepe web d in readiness for the drawing of the crepe web d onto the filling table 11 and, alos, the pairs of the grippers 28a and 28b so clamping the crepe web d can relatively pass through the associated engagement notches 18, respectively, shortly before the arrival of the crepe receiving table 10 at the horizontal position, with no breakage occurring in the continuous crepe web to be subsequently drawn onto the filling table 11.

The details of the positioning device e including the gripper assembly briefly mentioned in the description of the operation of the cutting unit f will now be described with particular reference to FIGS. 9 and 10.

As shown in FIGS. 9 and 10, the positioning device e comprises a pair of spaced guide frames 29 and 30 rigidly mounted on a suitable framework at a position on one side of the filling table 11 remote from the cutter means 4, and a pair of spaced guide rods 31 extending between the guide frames 29 and 30 in parallel relation to each other. Mounted on the guide rods 31 is a slidable carriage 32 movable along the guide rods 31 between the guide frames 29 and 30, said carriage 32 carrying the previously briefly mentioned gripper assembly in a manner as will now be described.

The gripper assembly comprises two separate pairs of upper and lower arms 33 and 34 of generally L-shaped configuration. The lower arms 34 are pivotally connected at one end to opposite lateral portions of the carriage 32 by means of respective pivot pins 36 for movement in a direction towards and away from each other about the respective pivot pins 36 in a plane generally parallel to the plane of the filling table 11, the other ends of said respective lower arms 34 being bent to face towards each other and formed into the grippers 28b.

On the other hand, the upper arms 33 overlay the adjacent lower arms 34 and are pivotally connected at one end to respective connecting fixtures 39 by means of pivot pins 35, which connecting fixtures 39 are connected to each other by means of a connecting shaft 40 rotatably supported by the carriage 32 such that the upper arms 33 can pivot between opened and clamped positions about the connecting shaft 40, the other ends of said respective upper arms 33 being bent to face towards each other and formed into the grippers 28a which are positioned immediately above the associated grippers 28b in the lower arms 34.

For enabling the upper arms 33 to be pivoted in a direction towards and away from each other about the respective pivot pins 35 together with the lower arms 34, engagement pins 38 are rigidly mounted on substantially intermediate portions of the respective lower arms 34, which engagement pins 38 extend loosely through respective slots 37 defined in substantially intermediate portions of the respective upper arms 33 in alignment with said engagement pins 38. It is to be noted that the length of each of the engagement pins 38 is so selected as to permit the free end of the engagement pin 38 to be still engaged in the corresponding slot 37 without being disengaged therefrom even when the upper arms 33 are pivoted to the opened position as shown in FIGS. 8(I) and 8(II).

While the carriage 32 is of generally U-shaped cross-section when viewed in a direction parallel to the direction of movement of the carriage, the U-shaped recess in the carriage 32 accommodates therein an actuating plate 41 having one end rigidly connected to and mounted on a portion of the connecting shaft 40 extending between portions of the carriage 32 which correspond respectively to the arms of a figure "U", the other end of said actuating plate 41 carrying an idler roller 42. As shown in FIG. 10, a pair of compression springs 43 are interposed between the carriage 32 and the actuating plate 41 such that the upper arms 33 are normally held in the clamped position as shown in FIG. 9 because the actuating plate 41 is so biased by the compression springs 43 about the connecting shaft 40 as to cause the upper arms 33 to assume the clamped position. In other words, a composite biasing force of the compression springs 43 is transmitted to the upper arms 33 through the connecting shaft 40 and then through the connecting fixtures 39.

The pivot pins 36 connecting the lower arms 34 to the carriage 32 in the manner described above have respective pin extensions 36a coaxial and fast therewith, which pin extensions 36a have respective actuating links 44 rigidly mounted thereon for rotation together therewith and extending in a direction towards each other. As best shown in FIG. 10, a free end of one of the actuating links 44 opposite to the associated pin extension 36a has a transmission pin 46 rigidly mounted thereon, which transmission pin 46 is engaged in an engagement cutout 45 defined in a free end of the other of the actuating links 44 opposite to the associated pin extension 36a whereby the pivotal movement of one of the lower arms 34 in one direction about the pivot pin 36 can be transmitted to the other of the lower arms 34 so as to cause the latter to pivot in the opposite direction about the pivot pin 36, as shown by the solid and chain lines in FIG. 10.

For effecting the pivotal movement of the lower arms 34 about the respective pivot pins 36 in the manner described above, one of the pin extensions 36a also has a pivot link 47 having one end rigidly connected thereto for rotation together therewith and the other end carrying a roller 48 rotatably mounted thereon. This roller 48 is in turn engaged in a guide groove 55a defined in and extending longitudinally of a pusher bar 55 supported in a manner as will be described later for movement between inoperative and operative positions in a direction laterally of the longitudinal axis of said pusher bar 55. In the construction so far described, when the pusher bar 55 is in the inoperative position as shown by the solid line in FIG. 10, the lower arms 34 together with the upper arms 33 are held in the position in which they extend in parallel relation to each other as shown by the solid line in FIG. 10, but when the pusher bar 55 is moved to the operative position shown partially by the chain line in FIG. 10, the lower arms 34 together with the upper arms 33 are pivoted in the direction away from each other about the respective pivot pins 36 as shown by the chain line in FIG. 10. In other words, as the pusher bar 55 is moved from the inoperative position towards the operative position, the roller 48 on the pivot link 47 moves along the guide groove 55a, causing the pin extension 36a to which said pivot link 47 is rigidly connected to pivot counterclockwise as viewed in FIG. 10 together with the pivot pin 36 adjacent the pivot link 47. Because the lower arms 34 are operatively coupled to each other by means of the actuating links 44 in the manner as hereinbefore described, the pivotal movement of one of the lower arms 34 is also equally transmitted to the other of the lower arms 34. Return movement of the pusher bar 55 from the operative position back towards the operative position of course causes the lower arms 34 to pivot in the direction towards each other in a manner reverse to that effected during the movement of the pusher bar 55 from the inoperative position towards the operative position.

The pusher bar 55 is supported laterally of the carriage 32 and extends in parallel relation to the guide rods 31. This pusher bar 55 has its operative ends connected to respective rocking levers 56 of different length, the longer rocking lever 56 having its substantially intermediate portion rigidly connected to the shorter rocking lever 56 by means of a connecting rod extending in spaced and parallel relation to the pusher bar 55 as best shown in FIG. 9. One other end of the longer rocking lever 56 opposite to the pusher bar 55 is operatively coupled to a suitable drive mechanism for moving the pusher bar 55 between the inoperative and operative positions. It is to be noted that the length of the guide groove 55a defined in the pusher bar 55 corresponds to the stroke of movement of the carriage 32.

For moving the gripper assembly between the retracted position adjacent the frame member 30 and the retracted position adjacent the frame member 29, a drive link 50 is utilized. This drive link 50 has one end rigidly mounted on a drive shaft 49 for rotation together therewith and the other end having an idler roller 51 rotatably mounted thereon. While the drive shaft 49 is rotatably supported by a bearing member on a suitable machine framework with its free end operatively coupled to a suitable drive mechanism through a cam mechanism, the idler roller 51 on the drive link 50 is engaged in a guide slot 52 defined in the undersurface of the carriage 32 and extending in a direction transversely of the direction of movement of the carriage. Accordingly, it will readily be seen that the pivotal movement of the drive link 50 about the drive shaft 49 results in the linear movement of the carriage 32 along the guide rods 31.

Extending above and in contact with the 42 carried by the actuating plate 41 is a presser bar 53 of a length corresponding to the stroke of movement of the carriage 32. This presser bar 53 is supported for movement between upwardly and downwardly shifted positions and is, for this purpose, rigidly mounted on a shifting rod 54 supported for movement in a direction perpendicular to the plane of movement of the carriage 32. In this construction, when and so long as the presser bar 53 is held in the upwardly shifted position with the shifting rod 54 having been upwardly shifted, the actuating plate 41 is kept biased by the compression springs 43 so as to bring the upper arms 33 to the clamped position. However, as the shifting rod 54 is downwardly shifted with the presser bar 53 consequently moving towards the downwardly shifted position, the actuating plate 41 is pivoted against the compression springs 43 with the idler roller 42 held in contact with the presser bar 53 being then moved towards the downwardly shifted position thereby causing the upper arms 33 to move from the clamped position towards the opened position.

The crepe positioning device e of the construction described above is so designed as to operate in the following manner.

When the continuous crepe web d is to be drawn onto the filling table 11 past the cutter means 4 preparatory to the cutting operation to provide the rectangular crepe d', the drive link 50 is pivoted clockwise as viewed in FIG. 9 about the drive shaft 49 to move the carriage 32 and, hence, the gripper assembly from the retracted position towards the projected position. Immediately after the start of the movement of the gripper assembly from the retracted position towards the projected position, the presser bar 53 is shifted towards the downwardly shifted position to pivot the actuating plate 41 against the compression springs 43 to bring the upper arms 33 to the opened position with the pairs of the grippers 28a and 28b consequently spaced apart from each other. Simultaneously with the shift of the presser bar 53 towards the downwardly shifted position, the pusher bar 55 is moved from the inoperative position towards the operative position without disturbing a smooth movement of the carriage 32.

It is to be noted that both the pivotal movement of the upper arms 33 to the opened position and the pivotal movement of the lower arms 34 in the direction away from each other together with the upper arms 33 is completed shortly before the grippers 28a and 28b pass through the clearance between the upper and lower cutter blades 3 and 2. It is also to be noted that the gripper assembly moves from the retracted position towards the projected position without interfering with the food stuffing filling unit g and, therefore, without disturbing a food stuffing filling operation performed by the filling unit g subject to the rectangular crepe d' which has previously been placed on the filling table 11.

As the gripper assembly approaches the projected position with the grippers 28a and 28b positioned on one side of the cutter means 4 opposite to the filling table 11, the pusher bar 55 is returned from the operative position towards the inoperative position to cause the lower arms 34 to pivot in the direction towards each other together with the upper arms 33 with the grippers 28a and 28b, which consequently are held in position ready to clamp the respective lateral edges of that portion of the crepe web d rearwardly of the cutter means 4. In response to or immediately after the arrival of the gripper assembly at the projected position as shown in FIG. 8(III), the presser bar 53 is shifted from the downwardly shifted position toowards the upwardly shifted position to permit the actuating plate 41 to pivot as biased by the compression springs 43 thereby to bring the upper arms 33 to the clamped position. By so doing, the lateral edges of that portion of the continuous crepe web d can be clamped by the pairs of the grippers 28a and 28b in the manner as hereinbefore described in connection with the cutter unit f. During that time, the food stuffing filling operation subjected to the previously placed rectangular crepe d' has already been completed on the one hand and the drive link 50 is reversed to rotate counterclockwise as viewed in FIG. 10 on the other hand.

The counterclockwise rotation of the drive link 50 results in the return movement of the gripper assembly from the projected position towards the retracted position with the continuous crepe web d pulled onto the filling table 11 and, thereafter, the cutting unit g is operated to cut the crepe web d to provide the next succeeding rectangular crepe d' onto the filling table 11.

It is to be noted that, since the uper arms 33 are pivoted to the opened position and, simultaneously therewith, the lower arms 34 are pivoted in the direction away from each other together with the upper arms 33 which are connected thereto by means of the rspective engagement pins 38 engaged in the associated slots 37, substantially simultaneously with the start of movement of the gripper assembly towards the projected position, not only can be rectangular crepe d', which has previously been placed on the filling table 11 as cut from the continuous crepe web d, be accurately positioned on the filling table 11, but also there is no possibility of the previously cut rectangular crepe d' being inadvertently pulled backwards towards the cutter means 4.

Figure 11:
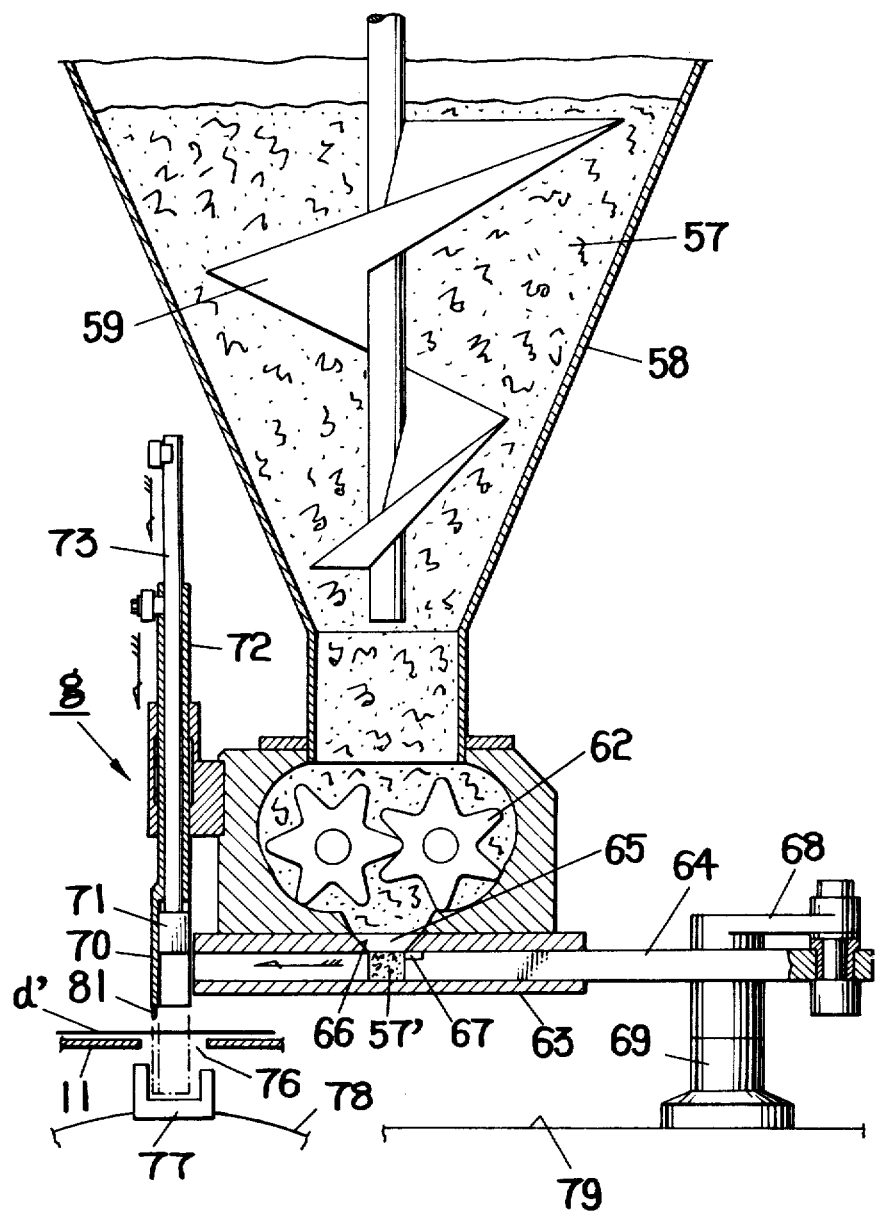
FIG. 11 is a side sectional view, on an enlarged scale, of a food stuffing supply unit used in the egg roll and spring roll making apparatus.

Referring now to FIGS. 11 and 12, the details of the food stuffing filling unit g will be described. This filling unit g comprises a generally funnel-shaped supply hopper 58 accommodating therein a mass of assorted food stuffing 57 and also accommodating therein a mixing screw 59 effective to uniformly mix materials for the assorted food stuffing and also to urge the assorted food stuffing towards the bottom of the hopper 58, said mixing screw 59 being, as shown in FIG. 3, supported from above and having one end coupled to a drive motor 60 atop a support frame 61. Positioned below the hopper 58 is a constant supply gear pump 62 of any known construction having a receiving port communicated to the hopper 58, and a transfer cylinder 63 positioned below the gear pump 62 and communicated to the interior of the gear pump 62 through a supply port 65.

The transfer cylinder 63 is of a generally rectangular hollow cross-sectional shape and has a transfer piston rod 64 axially movably inserted therein, said transfer piston rod 64 having a cross sectional representation complemental to the cross sectional shape of the follow of the transfer cylinder 63. The transfer piston rod 64 has one end operatively coupled to a drive mechanism through a swinging arm 68 supported by a boss 69 rigidly mounted on a machine bench 79. This transfer piston rod 64 is movable between stand-by and pushed positions as will be described later.

The piston rod 64 has a blade member 67 rigidly secured thereto at 67, which blade member 67 is cooperative with a knife edge 66 defined in a peripheral lip region defining the supply port 65 at a position on the leading side with respect to the direction of movement of the transfer piston rod 64 from the stand-by position towards the pushed position as indicated by the arrow in FIG. 11. The blade member 67 and the knife edge 66 are cooperative to each other to cut fibrous components of the assorted food stuffing, which has been supplied into the transfer cylinder 63, as the transfer piston rod 64 moves towards the pushed position.

Positioned frontwardly of the transfer cylinder 63 with respect to the direction of movement of the piston rod 64 towards the pushed position is shaping cylinder assembly which comprises a shaping cylinder 70 supported for movement in a vertical direction perpendicular to the direction of movement of the piston rod 64 and a filling piston member 71 supported for movement inside the shaping cylinder 70, said shaping cylinder 70 and said filling piston member 71 being driven independently of each other as will be described later. The shaping cylinder 70 has a hollow shifting rod 72 having one end rigidly connected thereto and the other end operatively coupled to a drive mechanism through a rocking arm 74 as shown in FIG. 3. On the other hand, the filling piston member 71 of generally rectangular configuration is movably housed inside the shaping cylinder 70 and is operatively coupled to a drive mechanism through a rigid shifting rod 73, slidably extending through the hollow of the shifting rod 72, by way of a rocking arm 75 as shown in FIG. 3.

As best shown in FIG. 12, the shaping cylinder 70 is of a generally rectangular box-like configuration and has both a wall portion of the cylinder 70, which will align with the transfer cylinder 63 as will be described later, and another wall portion of the same cylinder 70 facing below in opposition to the filling piston member 71 which are opened at 70b and 70a, respectively, for the purpose as will be described later. The shaping cylinder 70 has a plurality of spaced pickers 80 secured at a lower edge thereof and protruding downwardly of the shaping cylinder 70.

The shaping cylinder assembly of the construction described above is supported above the filling table 11 for the support of the rectangular crepe d' thereon, which table 11 has an opening 76 defined therein in a size sufficient to permit the shaping cylinder 70 to pass therethrough. Beneath the filling table 11, there is arranged a rotary disc 78 rigidly mounted on a transverse shaft 110 (FIG. 13) and carrying a plurality of, for example, four receptacles 77 of generally U-shaped cross-section rigidly mounted on the periphery of said rotary disc 78 in circumferentially 90° spaced relation to each other. This rotary disc 78 having the receptacles 77 thereon forms a part of the crepe folding device h, the details of which will subsequently be described with particular reference to FIGS. 13 to 15, is adapted to he intermittently rotated about the transverse shaft 110 so that, each time the rotary disc 78 is rotated through 90°, any one of the receptacles 77 is brought in alignment with and immediately below the opening 76 in the filling table 11.

It is to be noted that all of the constant supply gear pump 62, the transfer piston rod 64, the shaping cylinder assembly including the shaping cylinder 70 and the piston member 71, and their associated parts are supported above the machine bench 79 by means of any suitable supporting means. It is also to be noted that all of the constant supply gear pump 62, the transfer piston member 64, the shaping cylinder 70 and the piston member 71 are driven by a drive mechanism through a cam mechanism in predetermined time relation to each other so as to perform the sequence of operation which will now be described.

In response to the completion of the cutting of the continuous crepe web d, performed by the cutting unit f in the manner as hereinbefore described, with the rectangular crepe d' consequently placed on the filling table 11 in alignment with the opening 76, the constant supply gear pump 62 is operated to supply a predetermined amount of assorted food stuffing 57' from the hopper 58 through the supply port 65 into the transfer cylinder 63. Subsequently, the transfer piston rod 64 is moved from the stand-by position towards the pushed position by the swinging motion of the swinging arm 68 actuated by a separate cam mechanism (not shown). As the transfer piston rod 64 is so moved towards the pushed position, a mass of the food stuffing 57' so supplied into the transfer cylinder 63 is pushed towards the shaping cylinder 70 and, upon arrival of the transfer piston rod 64 at the pushed position, filled into the transfer cylinder 70 at a position immediately below the piston member 71 through the opened wall portion 70b of the shaping cylinder 70.

In response to the arrival of the transfer piston rod 64 at the pushed position, the shaping cylinder 70 and the piston meber 71 are simultaneously lowered by the action of a cam mechanism with the pickers 81 subsequently piercing the rectangular crepe d' resting on the filling table 11 to avoid any undesirable displacement of the rectangular crepe d' relative to the shaping cylinder assembly. On the other hand, immediately after the start of the simultaneous lowering motion of the shaping cylinder 70 and the piston member 71, the piston rod 64 is allowed to return from the pushed position towards the stand-by position.

During the continued lowering movement of the shaping cylinder 70 and the piston member 71, the shaping cylinder 70 pushes a portion of the rectangular crepe d' on the filling table 11 which is then situated immediately below a shaped block of assorted stuffing 57' inside the shaping cylinder 70, thereby allowing that portion of the rectangular crepe d' to pass through the opening 76 in the filling table 11 until it is seated within one of the receptacles 77 which is then aligned with and positioned immediately below the opening 76 in the filling table 11.

At the same time as that portion of the rectangular crepe d' is seated within said one receptacle 77 on the rotary disc 78, the lowering motion of the shaping cylinder 70 is interrupted while allowing the piston member 71 to continue its lowering movement to push the shaped block of food stuffing 57' onto the rectangular crepe d' and, particularly, onto that portion of the rectangular crepe d' seated within the receptacle 77, thereby filling up the receptacle 77 with the shaped block of food stuffing 57'.

Subsequent thereto, the shaping cylinder assembly, i.e., the shaping cylinder 70 and the associated piston member 71, starts its return movement back to the original position, leaving the rectangular crepe d' and the shaped block of food stuffing 57' in the form as received in the receptacle 77 on the rotary disc 78. During this return movement of the shaping cylinder assembly back towards the original upwardly shifted position, the return movement of the shaping cylinder 70 takes place to allow the picker 81 to be disengaged from the rectangular crepe d' while the piston member 71 retains the shaped block of food stuffing 57' within the receptacle 77 together with the portion of the crepe d', followed by the return movement of the piston member 71.

The details of the crepe folding device h including the rotary disc 78 with the receptacles 77 thereon as hereinabove described are best shown in FIGS. 13 and 14. This crepe folding device h is positioned and arranged below the filling table 11. Referring now to FIGS. 13 and 14, in addition to the rotary disc 78 within the receptacles 77 thereon, the crepe folding device h comprises curved flaps 82 equal in number to the number of the receptacles 77, each of said flaps 82 being curved to follow the curvature of the rotary disc 78 and movable between folding and disengaged positions, as will be described later, in a direction circumferentially of the rotary disc 78. For the support of the flaps 82, the rotary disc 78 mounted on the transverse shaft 110 carries four bell cranks 84 pivotally secured thereto by means of respective pivot pins 83, each of said bell cranks 84 having one end connected to and supporting the corresponding flap 82 and the other end carrying a respective idler roller 85. Each of these curved flaps 82 is normally biased to the folding position by the action of a repsective biasing spring 86 interposed between the corresponding bell crank 84 and the rotary disc 78, said curved flap 82 when so biased to the folding position being held in position to close the opening of the associated receptacle 77 which corresponds to the top of a figure "U" of the cross-sectional representation of each receptacle 77. A release mechanism for moving any one of the curved flaps 82 from the folding position to the disengaged position against the biasing spring 86 is arranged on one side laterally of the rotary disc 78 and includes rotary shaft 88 extending in parallel to each other and each having one end rigidly connected to a respective actuating lever 87 engageable with any one of the idler rollers 85 on the respective bell cranks 84. The actuating levers 87 are so designed and so positioned that each two of the curved flaps 82 associated with respective two receptacles 77 on the rotary disc 78 can be pivoted about the corresponding pivot pins 83 from the folding position to the disengaged position against the corresponding biasing springs 86 with the corresponding idler rollers 85 kicked by said actuating levers 87 when the rotary shafts 88 are rotated in one direction. One of the receptacles 77 is brought into alignment with and immediately below the opening 76 in the filling table 11 during the intermittent rotation of the rotary disc 78 and the other of which is 180° spaced from said one of the receptacles 77. The disengaged position for each curved flap 82 is located on the trailing side of the rotary disc 78 with respect to the direction of rotation of said rotary disc 78 as shown by the arrow in FIG. 13 and, therefore, any one of the curved flaps 82 when in the disengaged position opens the opening of the associated receptacle 77. The other end of one of the rotary shafts 88, which is operatively associated with one of the receptacles 77 then aligned with and positioned immediately below the opening 76 in the filling tavle 11, has rigidly mounted theron a generally V-shaped connecting member 89 having two arms, one of said arms of the V-shaped connecting member 89 being pivotally connected by means of a connecting rod 90 to a connecting arm 89a fast on the other end of the other of the rotary shafts 88 associated operatively with the receptacle 77 spaced 180° from said one of the receptacles 77, whereas the other of the arms of the V-shaped connecting member 89 is operatively coupled to a pull rod 91. Accordingly, it will readily be seen that any one of the curved flaps 82 associated with the receptacle 77 then brought into alignment with the opening 76 in the filling table 11 and the curved flap 82 radially opposite to said any one of the curved flaps 82 are simultaneously moved from the folding position to the disengaged position as best shown in FIG. 13 to permit the associated, opposite receptacles 77 to receive the shaped block of assorted food stuffing 57' together with the rectangular crepe d' and discharge it onto a subsequent processing station, respectively, as will be described in more detail later.

As best shown in FIG. 14, each of the curved flaps 82 has a pair of parallel slots 92 extending in a direction circumferentially of the rotary disc 78 from one of the opposite side edges thereof on the leading side with respect to the direction of rotation of the rotary disc 78, said slots 92 being spaced from each other a distance substantially equal to the length of any one of the receptacles 77 as measured in a direction perpendicular to the rotary disc 78, the function of which will be described later.

On one side of the vertical line passing between the filling station, where the shaped block of food stuffing 57' is filled together with the rectangular crepe d' into the receptacle 77 then aligned below the opening 76, and the discharge station where the block of food stuffing transferred from the filling station is discharged from the receptacle 77, a curved back-up rod 93 being curved to follow the curvature of the circular path along which the flaps 82 move during the rotation of the rotary disc 78 is arranged to back up the flaps 82 successively from exteriorly of the flaps 82. This back-up rod 93 has one end rigidly secured at 94 to a portion of a machine framework beneath the filling table 11.

Positioned immediately below the rotary disc 78 is a shiftable tape 96 rigidly mounted on a shift rod 95 movable between receiving and transfer positions, as will be described later, in a vertical direction at right angles to the transverse shaft 110. By the reason which will become clear from the subsequent description, the shiftable table 96 has a width corresponding to the length of any one of the receptacles 77. As best shown in FIGS. 14 and 15, a pair of guide plates 97 are positioned one on each side of the shiftable table 96 and fixedly supported through respective connecting pieces 101 by support sleeves 100 which are rigidly mounted on a machine framework 99. Each of the guide plates 97 has a height sufficient to accommodate the stroke of movement of the shiftable table 96 between the receiving and transfer positions, and the pair of the guide plates 97 are spaced from each other a distance corresponding to the width of the shiftable table 11.

Positioned above the respective guide plates 97 are a pair of ejecting plates 98 one on each side of the rotary disc 78 and spaced from each other a distance substantially equal to the span between the slots 92 in each of the curved flaps 82. As best shown in FIG. 15, these ejecting plates 98 are simultaneously movable between inoperative and ejecting positions in a direction at right angles to the transverse shaft 110 and, for this purpose, supported by shiftable rods 102 by means of connecting pieces 103, respectively, said shiftable rods 102 being in turn axially movably inserted through and, therefore, supported by the support sleeves 100. It is to be noted that, when the ejecting plates 98 are in the ejecting position, they are held in face-to-face relation to the adjacent guide plates 97 and positioned between the guide plates 97 and the shiftable table 96.

The crepe folding device h also comprises a pusher mechanism 104 positioned in alignment with and rearwardly of the shiftable tables 96 with respect to the direction in which the crepe d' having the shaped block of food stuffing 57' thereon is to be pushed away from the shiftable table 96. As best shown in FIGS. 16 and 17, the pusher mechanism 104 comprises a pusher block 107 rigidly connected to a pusher rod 106 axially movably supported by a pair of spaced bearing members 105, said pusher rod 106 being operatively coupled to a drive shaft 108 by means of a cranking arm 109 so designed that, when the drive shaft 108 is rotated counterclockwise and clockwise as viewed in FIG. 16, the pusher rod 106 and, hence, the pusher block 17 can linearly be moved from a pushed position towards a retracted position and from the retracted position towards the pushed position, respectively. The pusher block 107 is so designed that, when the shiftable table 96 is in the transfer position, it can move above the shiftable table 96 and between the guide plates 97, said pusher block 107 being, however, clear of the shiftable table 96 when in the retracted position.

Positioned laterally of the pusher block 107 with respect to the direction of movement thereof is a bond applicator 119 which comprises a generally pantograph link mechanism 112 operatively carried by a bracket 111 fast with the machine framework, a vertical shiftable drive rod 114 operatively connected to the link mechanism 112 through a transmission lever 113 for driving said link mechanism 112, an applicator nozzle 116 carried by the link mechanism 112 through a support member 115 and positioned above the shiftable table 96 when the latter is in the transfer position, and a reservoir 118 accommodating a substantial amount of bonding agent therein and communicated to the applicator nozzle 116 through a flexible supply pipe 117. This bond applicator 119 is so designed that, as the drive rod 114 is downwardly shifted as shown in FIG. 13, the link mechanism 112 causes the applicator nozzle 116, which is held in position clear of the shiftable table 96 in the receiving position as shown by the chain line in FIG. 13 when the drive rod 14 is upwardly shifted, to pivot to assume a position above the shiftable table 96 then being moved towards the transfer position in synchronism therewith, as shown by the solid line in FIG. 13.

Referring now to FIGS. 13, 16, 18 and 19, the rolling device i comprises a pair of first and second rolling mechanisms 120 of substantially identical construction positioned one on each side and frontwardly of the shiftable table 96 and arranged in symmetrical relation to each other with respect to the shiftable table 96. Each rolling mechanism 120 comprises an end block 123, a lower finger member 121 extending outwardly from the end block 123 in a direction towards the other rolling mechanism 120, a generally outwardly tapered upper finger member 122 on one side of the end block 123 opposite to the lower finger member 121 and supported for pivotal movement between upright and horizontal positions, a stopper member 127 protruding in the same direction as the lower finger member 121 and lying at right angles to said lower finger member 121, and a retainer finger member 141 protruding in the same direction as any one of the members 121, 122 and 127 and having one end connected to the upper finger member 122 for pivotal movement together therewith, said retainer finger member 141 lying at right angles to the upper finger member 122. Each rolling mechanism 120 constructed with the above described components is so designed that, when and so long as the upper finger member 122 is in the horizontal position as shown in FIGS. 16 and 18, a food block 124 shown in FIG. 20 VIII-XIV, composed of the shaped block of food stuffing 57' filled in the crepe d' as will be described later has its one end portion received in a rectangular space defined by the members 121, 122, 123, 127 and 141, the other end portion of said food block 124 being similarly received in a rectangular space which is defined by the members 121, 122, 123, 127 and 141 of the other rolling mechanism 120. It is, however, to be noted that, as will become clear from the subsequent description, transportation of the food block 124 from the shiftable table 96 onto the rolling mechanisms 120, particularly onto the lower finger members 121 of the respective rolling mechanism 120 is carried out by the aid of the pusher mechanism 104 when and so long as the upper finger members 122 of the respective rolling mechanisms 120 are held in the upright positions as shown by the solid line in FIG. 19. together with the retainer finger members 141 while the shiftable table 96 is in the transfer position.

These rolling mechanisms 120 are rotatable to roll the food block 124 and also retractable to release the food block 124. For this purpose, as best shown in FIGS. 18 and 19, the endblock 123 of each rolling mechanism 120 is rigidly secured to one end of an internal rotary shaft 126 supported for only rotation by a bracket 125, said rotary shaft 126 being slidably inserted through an slidable hollow shaft 128. This hollow shaft 128 is capable of undergoing both an axial sliding movement and a rotary motion relative to the rotary shaft 126, a substantially intermediate portion of said shaft 128 having a gear 129 mounted thereon by means of an axial spline arrangement 132. The gear 129 is in turn rotatably supported by a machine framework 131 by means of bearings 130. The axial spline arrangement 132 through which the gear 129 is mounted on the hollow shaft 128 is well known to those skilled in the art and is so designed that the hollow shaft 128 can rotate together with the gear 129 and can axially move independently of and relative to the gear 129. The gear 129 is constantly meshed to a drive gear 133 as best shown in FIG. 19.

Referring still to FIGS. 18 and 19, the hollow shaft 128 has a pair of circumferentially groove wheels 134 and 138 mounted thereon on each side of the gear 129. The wheel 134 is rigidly mounted on the hollow shaft 128 for axial and rotary movement together with said shaft 128 and is operatively coupled to a rocking arm 135 having one end connected to a drive mechanism and the other end operatively engaged through an idler roller in the circumferential groove in the wheel 134, such that the rocking movement of the rocking arm 135 can result in the axial movement of the wheel 134 together with the hollow shaft 128.

One end of the hollow shaft 128 remote from the wheel 134 and adjecent the shiftable table 96 carries the finger members 121 and 122 one above the other, said lower finger member 121 being rigidly connected thereto while said upper finger member 122 is pivotally connected thereto by means of a pivot pin 136. As best shown in FIG. 18, one end of the pivot pin 136 is rigidly connected to a pivot lever 137 which is in turn operatively coupled to the circumferentially grooved wheel 138 by means of a motion transmitting lever 140. The wheel 138 is mounted on the hollow shaft 128 for rotation together with the hollow shaft 128 and also for axial sliding movement relative to the hollow shaft 128 by the utilization of a portion of the axial spline arrangement 132, said wheel 138 being in turn operatively coupled to a rocking arm 139 having one end connected to a drive mechanism and the other end operatively engaged through an idler roller in the circumferential groove in the wheel 138, such that the rocking motion of the rocking arm 139 can result in an axial movement of the wheel 138 along the hollow shaft 128 between positions shown respectively by the solid and chain lines in FIG. 19 depending on the direction of movement of the rocking arm 139. In this arrangement, the upper finger member 122 of each rolling mechanism 120 is so connected to the wheel 138 through the motion transmitting lever 140 by way of the pivot lever 137 that the axial movement of the wheel 138 from the solid line position to the chain line position and from the chain line position to the solid line position results in the pivotal movement of the upper finger member 122 from the upright position to the horizontal position and from the horizontal position to the upright position, respectively, together with the retainer finger member 141.

The previously mentioned stopper member 127 of each rolling mechanism 120 is, while it extends in the manner as hereinbefore described, so rigidly connected to the motion transmitting lever 140 that, when the hollow shaft 128 is axially moved towards the left as viewed in FIG. 19, that is, in a direction towards the shiftable table 96, it can project to a position ready to support the food block 124 being transferred from the shiftable table 96 onto the lower finger members 121 of the respective rolling mechanisms 120 by the aid of the pusher mechanism 104 so as to prevent the food block 124 from falling over the lower finger members 121.

It is to be noted that the drive mechanism described above and best shown in FIGS. 18 and 19 is provided for each of the first and second rolling mechanisms 120.

As best shown in FIGS. 13 and 16, the rolling device i also comprises upper and lower retainer assemblies 142a and 142b one above the other with respect to the rolling mechanisms 120. Each of the retainer assemblies 142a and 142b comprises a plurality of, for example, three, elongated elastic plates or leaf springs 44 each having a respective retainer block 145 rigidly mounted thereon and the other end rigidly secured to a respective base member 143. These retainer assemblies 142a and 142b are supported for pivotal movement between retaining and release positions and are so designed that, when they are in the retaining positions, the retainer blocks 145 of the respective assemblies 142a and 142b retain from above and below under a slight pressure the food block 124 which is then retained by the rolling mechanisms 120 with its opposite end portions received in the spaces defined by the members 121, 122, 123, 127 and 141 of the respective rolling mechanisms 120. However, when the retainer assemblies 142a and 142b are in the release position, the retainer blocks 145 are clear of the food block 124.

Extending below the first and second rolling mechanisms 120 in a direction away from the shiftable table 96 at right angles to the direction of movement of the rolling mechanisms 120 away from and close towards each other is an endless conveyor 146 for transporting the food block 124, that is, a complete egg roll, from the rolling station towards the subsequent processing station. The subsequent processing station followed by the following station may be the one where the complete egg roll is deep fried.

The various mechanisms of the positioning device e, the filling unit g, the crepe folding device h and the rolling device i, described hereinbefore are operatively associated with each other and are operable in sequentially timed relation by the aid of cam mechanisms (not shown) driven by one or more drive mechanism (not shown) to perform requisite processes which will now be described with particular reference to FIGS. 20 to 22.

Referring to FIG. 20, and as shown in FIG. 20(I), assuming that the rectangular crepe d' cut from the continuous crepe web d by the cutting unit f is positioned above the filling table 11 in alignment with the opening 76 by the action of the positioning device e operated in the manner as hereinbefore described, and also assuming that the food stuffing 57' from the hopper 58 has been charged in the shaping cylinder 70 in the manner as hereinbefore described, the shaping cylinder 70 and the piston member 71 are simultaneously lowered. As the shaping cylinder assembly including the shaping cylinder 70 and the piston member 71 is so lowered, the shaping cylinder 70 protrudes through the opening 76, pressing a portion of the crepe d' through the opening 76 downwardly onto one of the receptacles 77 on the rotary disc 78 then held in the filling station as shown in FIG. 20(II). At this time, the curved flap 82 associated with the receptacle 77 held in the filling station has been moved to the disengaged position and, therefore, the receptacle 77 in the filling station receives therein the crepe d' so downwardly pressed through the opening 76 by the lowering shaping cylinder 70. Subsequent to completion of the lowering of the shaping cylinder 70, the piston member 71 continues its lowering movement independently of the shaping cylinder 70 to press the shaped block 57' of food stuffing into the receptacle 77 in the filling station so that a portion of the crepe d' deformed to conform to the recess in the receptacle 77 receives therein the shaped block of food stuffing 57', as shown in FIG. 20(III). It is to be noted that the shaped block of food stuffing 57' so filled as hereinabove described is positioned, as shown in FIG. 2(I), on one side of the diagonal line 149 of the shape of the crepe d' with its longitudinal axis generally parallel to said diagonal line 149 and adjacent a first corner portion of the crepe d'.

Subsequent to completion of the lowering of the piston member 71, the shaping cylinder assembly, that is, both the shaping cylinder 70 and the piston member 71, is upwardly shifted back towards the original position, leaving the crepe d' and the shaped block of food stuffing 57' in the receptacle 77 in the filling station. In response to and immediately after the upward shift of the shaping cylinder assembly back towards the original position, the curved flap 82 then held in the disengaged position is pivoted towards the folding position as shown in FIG. 20(IV).

As the curved flap 82 associated with the receptacle 77 in the filling station is pivoted from the disengaged position towards the folding position, the first corner portion of the crepe d' is folded to overlay the shaped block of food stuffing 57' in contact with the leading side edge thereof.

Upon arrival of the curved flap 82 at the folding position, the rotary disc 78 is rotated through 90°. During this 90° rotation of the rotary disc 78, a second corner portion of the crepe d' diagonally opposite to said folded first corner portion thereof is bent to overlay the curved flap 82 in the folding position and positioned between the back-up rod 93 and the curved flap 82 as shown in FIG. 20(V). This condition is maintained until the receptacle 77 with the crepe d' and the shaped block of food stuffing 57' therein approached the discharge station by the further 90° rotation of the rotary disc 78.

As the receptacle 77 with the crepe d' and the shaped block of food stuffing 57' therein approaches the discharge station as a result of the 180° rotation of the rotary disc 78, the second corner portion of the crepe d' leaves from the back-up rod 93 and falls by gravity onto the shiftable table 96 then held in the receiving position as shown in FIG. 20(VI). Upon arrival of the receptacle 77 at the discharge station, that is, upon completion of the 180° rotation of the rotary disc 78, the curved flap 82 in the folding position is pivoted to the disengaged position in the manner as hereinbefore described and, simultaneously therewith, the ejecting plates 98 are downwardly shifted to forcibly transfer the crepe d' with the shaped block of the food stuffing 57' onto the shiftable table 96 in the receiving position as shown in FIG. 20(VII). It is to be noted that, as the ejecting plates 98 descent towards the shiftable table 76 in the receiving position, the third and fourth corner portions of the crepe d' which protrude in the opposite directions away from the shaped block of food stuffing 57' are pressed downwards in contact with the ejecting plates 98 to separate the crepe d' with the shaped block of food stuffing 57' away from the receptacle 77 in the discharge station.

As the ejecting plates 98 further descends, the shiftable table 96 starts its movement from the receiving position towards the transfer position in unison with the ejecting plates 98, resulting in that the third and fourth corner portions of the crepe d' protruding laterally outwardly of the shaped block of food stuffing 57' are folded to extend in a direction perpendicular to the shiftable table 96 and then sandwiched between the ejecting plates 98 and the guide plates 97 as shown in FIG. 20(VIII).

In response to the arrival of the shiftable table 96 at the transfer position, the pusher mechanism 104 is operated to move the pusher block 107 from the retracted position to the pushed position. Simultaneously therewith, the bond applicator 119 is also operated to bring the applicator nozzle 116 to a position immediately above the shiftable table 96. The pusher mechanism 104 and the bond applicator 119 are so timed that, when the pusher block 107 being moved from the retracted position towards the pushed position approaches the shaped block of food stuffing 57', which is half wrapped with the crepe d', and is then resting on the shiftable table 96 in the transfer position, the applicator nozzle 116 is held in position above, and applies an edible bonding agent to, the second corner portion 147 (FIG. 21(IV)) of the crepe d' lying on the shiftable table 96 through a recess 107a (FIG. 17) in the pusher block 107 as shown in FIG. 20(IX). As the pusher block 107 is further moved towards the pushed position, it contacts the food block 124, that is, the shaped block of food stuffing 57' wrapped halfway with the crepe d' in a manner as shown in FIG. 2(IV), and pushes the food block 124 onto the rolling mechanisms 120. However, it is to be noted that, in order to avoid any possible contact of the pusher block 107, then being moved towards the pushed position above the shiftable table 96, with the second corner portion of the crepe d' lying on the shiftable table 96 which would result in an undesirable breakage and/or roll-up of the second corner portion of the crepe d', the shiftable table 96 is further lowered beyond the transfer position to provide a sufficient space between the table 96 and the pusher block 107 to allow the latter to pass over the second corner portion of the crepe d' lying on the table 96, the shiftable table 96 being, however, slightly upwardly shifted to assume the transfer position shortly before the pusher block 107 contacts the body 148 of the food block 124.

Shortly before the food block 124 is pushed onto the rolling mechanisms 120, the hollow shafts 128 are moved by the respective rocking arms 135, 138 in a direction close towards each other with the lower finger members 121 and the stopper members 127 consequently projecting relative to the respective end blocks 123 in the direction towards each other while the upper finger members 122 of the respective rolling mechanisms 120 remain in the upright positions and the upper and lower retainer assemblies 142a and 142b are held in a position clear of the rolling mechanisms 120 as shown in FIG. 20(IX). At the time the pusher block 107 arrives at the pushed position, the food block 124 is transferred onto the lower finger members 121 and is positioned between the end blocks 123 as shown in FIG. 20(X). The stopper members 127 then serve to prevent the food block 124 from falling over the lower finger members 121 in a direction opposite to the pusher block 107.

In response to the arrival of the pusher block 107 at the pushed position, the pusher block 107 starts its return movement towards the retracted position on the one hand and, on the other hand, the upper finger member 122 of the first rolling mechanism 120 is pivoted from the upright position towards the horizontal position together with the associated retainer finger member 141 as shown in FIG. 20(XI), followed by the similar pivotal movement of the upper finger member 122 of the second rolling mechanism 120 from the upright position towards the horizontal position together with the associated retainer finger member 141.

By so doing, the food block 124 is gripped by the first and second rolling mechanisms 120 with the second corner portion of the crepe d' still resting on the shiftable table 96.

As shown in FIG. 20(XII), upon arrival of the upper finger member 122 of the second rolling mechanism 120 at the horizontal position, the upper and lower retainer assemblies 142a and 142b are simultaneously pivoted to resiliently clamp the food block 124 with the retainer blocks 145 of the respective retainer assemblies 142a and 142b contacting the upper and lower finger members 121 and 122 of the respective rolling mechanisms 120 under pressure. While this condition is maintained, the first and second rolling mechanisms 120 holding the food block 124 are rotated through 720° about the rotary shafts 126 to roll up the second corner portion of the crepe d' around the body 148 as shown in FIG. 20(XIII). The rotation of the first and second rolling mechanisms 120 is effected by driving the gear 129 by means of the drive gear 133, the rotation of said gears 129 being transmitted to the hollow shafts 128 to rotate the first and second rolling mechanisms 120, respectively.

It is to be noted that, at the time the second corner portion of the crepe d' is rolled around the body 148 of the food block 124, the retainer blocks 145 supported by the leaf springs 144 of the respective retainer assemblies 142a and 142b resiliently contact the body 148 of the food block 124 and, therefore, the second corner portion of the crepe d' can be relatively firmly rolled around the body 148 without being loosened. In addition, since in the condition shown in FIG. 20(XII) wherein the upper and lower finger members 121 and 122 hold the body 148 therebetween, the associated retainer finger members 141 are positioned laterally of the body 148 and substantially above the second corner portion of the crepe d', the rotation of the rolling mechanisms 120 about the shafts 126 permits the second corner portion of the crepe d' to be assuredly rolled around the body 148 without permitting the latter to displace relative to the retainer finger members 141.

Upon completion of the 720° rotation of the first and second rolling mechanisms 120, the hollow shafts 128 are moved by the rocking arms 135 in a direction away from each other with the upper and lower finger members 121 and 122 of the first and second rolling mechanisms 120 are pulled out of the rolled food block 124, leaving the latter in the form as sandwiched between the retainer blocks 145 of the respective retainer assemblies 142a and 142b as shown in FIG. 20(XIII).

The rolled food block 124 so held by the retainer assemblies 142a and 142b in the manner described above and shown in FIG. 20(XIII) is then lowered onto the conveyor 146 with the upper and lower retainer assemblies 142a and 142b pivoting counterclockwise and clockwise as viewed in FIG. 20(XIV) until the rolled food block 124 rests on the conveyor 146 as shown in FIG. 20(XIV). At the time the rolled food block 124 is brought onto the conveyor 146, both of the retainer assemblies 142a and 142b are pivoted clockwise to return to the original positions. It is to be noted that the retainer blocks 145 of the lower retainer assembly 142b pass through interstices in the conveyor 146 during the return movement of said assembly 142b to the original position.

In the manner as hereinbefore fully described, the assorted food stuffing is rolled in the generally rectangular crepe to provide the egg roll.

Thus, the machine embodying the present invention is effective to undergo a sequential process of placing the generally elongated shaped block of assorted food stuffing on the generally rectangular crepe d' cut from the continuous crepe web d so that the shaped block of food stuffing 57' can assume a position on one side of the diagonal line 149 of the shape of the crepe d' adjacent the first corner portion thereof with its longitudinal axis generally parallel to the diagonal line 149 as shown in FIG. 21(I); folding the first corner portion of the crepe d' to overlay the shaped block of food stuffing 57' by the aid of the curved flap 82 as shown in FIG. 21(II); folding of the second corner portion of the crepe d' to partially overlay the folded first corner portion of the crepe d' by the aid of the back-up rod 93 as shown in FIG. 21(III); bending the third and fourth corner portions of the crepe d', which are then protruding in the opposite directions away from the substantially enclosed food body 148, to extend in the same direction at right angles to the longitudinal axis of the food body 148 by the aid of the ejecting plates 98 in cooperation with the guide plates 97 as shown in FIG. 21(IV); folding the third and fourth corner portion of the crepe d' so as to overlay the food body 148 by the aid of the upper and lower finger members 122 and 121 of the first and second rolling mechanisms 120 as shown in FIG. 21(V); and finally rolling the food body 148 to cause the rest of the second corner portion of the crepe d' to be rolled over the food body 148 with the apex region of the second corner portion bonded to the wrapped food body 148, thereby completing the formation of the egg roll ready to be deep fried or ready for shipment as shown in FIG. 21(VI).

Important to note is that the shaped block of assorted food stuffing 57' is placed on the rectangular crepe d' at a location on one side of the diagonal line 149 of the shape of the crepe d' adjacent the first corner portion. Because of the position of the shaped block of assorted food stuffing 57' so selected as hereinbefore described, when the first corner portion of the crepe d' is folded to overlay the shaped block of food stuffing 57' in the manner as shown in FIG. 22(II), the first corner portion of the crepe d' so overlaying the shaped block of food stuffing 57' can subsequently be turned backwards as the second corner portion of the same crepe d' is folded to partially overlay or overlap the folded first corner portion, as can readily be seen from FIG. 22(III), by the aid of the back-up rod 93. Therefore, a portion of the shaped block of food stuffing 57', such as indicated by 57a', is covered by three layers of the crepe d'. On the other hand, with respect to another portion 57b' of the shaped block of food stuffing 57' opposite to said portion 57a', when and after the third and fourth corner portions of the crepe d' have been folded to overlay the shaped block of food stuffing 57' as shown in FIG. 21(V), such another portion 57b' of the shaped block of food stuffing 57' is also covered by three layers of the crepe d' as shown in FIG. 22(V). Accordingly, at the time of completion of the formation of the egg roll, the shaped block of food stuffing 57' can substantially uniformly be wrapped with folded layers of the crepe d'.

Although the present invention has fully been described in connection with the preferred embodiment thereof with reference to the accompanying drawings, it is to be noted that various changes and modifications are readily apparent to those skilled in the art in consideration of the disclosure of the present invention. By way of example, although the number of the receptacles 77 on the rotary disc 78 has been described as four, it may be one, two, three or more than four. In addition, although the upper finger member 122 of the first rolling mechanism 120 and that of the second rolling mechanism 120 have been described as successively pivoted to the horizontal positions, they may be simultaneously pivoted.

Accordingly, such and other changes and modifications are to be construed as included within the scope of the present invention as represented by the appended claims, unless they depart therefrom.

I claim:

1. A machine for automatically making a rolled food product by rolling a food stuffing in a generally rectangular edible skin having first and second diagonally opposite corner portions and third and fourth diagonally opposite corner portions, which machine comprises, in combination:

means for depositing food stuffing on an edible skin at a location on a first corner portion of a diagonal between opposite corners of the skin, with a longer side of said food stuffing parallel to said diagonal while the skin is lying flat on a table;

means for shaping the food stuffing into an elongated configuration to adapt the stuffing to be handled by said means for depositing, folding means for folding the first corner portion of the skin, which has thereon the food stuffing, so as to overlay the the food stuffing, for turning said overlay backwards and for folding the third and fourth corner portions on respective sides of the food stuffing so as to overlay the food stuffing at a location opposite to the portion of the food stuffing where the first corner portion is overlaid; and means for rolling the second corner portion of the skin up around the thus overlayed food stuffing to complete the rolled food product.

2. A machine as claimed in claim 1, wherein said depositing means comprises a supply hopper accommodating therein a substantial amount of food stuffing, a transfer cylinder assembly positioned beneath the supply hopper and including a transfer cylinder having an exit at one end and a piston member, said transfer cylinder being communicated to the supply hopper for receiving a predetermined amount of the food stuffing, said piston member being operable to push the food stuffing towards the transfer exit, and a shaping cylinder assembly including a shaping cylinder of and having receiving and filling openings defined therein and supported for movement between first and second positions in a direction generally perpendicular to the direction in which the food stuffing within the tranfer cylinder is pushed and also to said table, said receiving opening when said shaping cylinder is in the first position being communicated to the transfer exit for receiving the food stuffing so pushed by the piston member, said shaping cylinder assembly also including a piston means movably housed within the shaping cylinder and operable to push the food stuffing within the shaping cylinder onto said skin on said table through said filling opening when the shaping cylinder is in the second position, thereby filling the food stuffing onto said skin at said location relative to said diagonal.

3. A machine as claimed in claim 2, wherein a portion of the shaping cylinder adjacent and around the filling opening is provided with a plurality of spaced pickers protruding downwardly therefrom towards said table.

4. A machine as claimed in claim 1, wherein said folding means comprises a rotary disc supported for rotation in one direction and having a plurality of receptacles rigidly mounted on the periphery thereof in circumferentially equally spaced relation to each other with respective openings of said receptacles facing radially outwardly of the rotary disc, said receptacles being sequentially moved past a filling station, where each receptacle is sequentially aligned below the shaping cylinder, and also a discharge station during each rotation of the rotary disc, said rotary disc having flap members equal in number to the number of the receptacles and each of said flap members being supported for movement between a disengaged position, in which the opening of the corresponding receptacle is opened, and a folding position in which the opening of the corresponding receptacle is closed by said flap member, each of said flap members being moved from the folding position towards the disengaged position each time the corresponding receptacle arrives at any one of the filling and discharge stations during the rotation of the rotary disc, said flap member when moved from the disengaged position towards the folding position after the food stuffing has been filled in said receptacle by the shaping cylinder together with the skin, operable to fold the first corner portion of the skin so as to overlay the food stuffing, a back-up rod means substantially extending between the filling and discharge positions adjacent the path of movement of the flap members together with the rotary disc and positioned on the leading side with respect to the direction of rotation of the rotary disc, said back-up rod means being cooperative with said flap members to fold the second corner portion of the skin so as to overlay the folded first corner portion of the skin, a shiftable table supported for movement between an up position, where the shiftable table receives the food stuffing wrapped halfway with the skin from the receptacle then held in the discharge station, and a down position, guide plate means one on each side of the shiftable table and extending a distance corresponding to the stroke of movement of the shiftable table, an ejecting plate means on each side of at least one of the receptacles and supported for movement between retracted and ejecting positions, said ejecting plate means when moved from the retracted position towards the ejecting position separating the food stuffing within the corresponding receptacle together with the skin therefrom and onto the shiftable table then in the up position, said ejecting plate means being cooperative with said guide plate means to bend the third and fourth corner portions of the skin in a direction substantially parallel to the direction of movement of the shiftable table as said ejecting plate means is moved towards the ejecting position while the shiftable table is moved towards the down position.

5. A machine as claimed in claim 4, further comprising a pusher mechanism positioned on one side of the shiftable table when the latter is in the down position, and wherein said rolling means comprises a pair of rolling mechanisms arranged on the other side of the shiftable table with respect to the pusher mechanism wherein there is one on each side of the direction in which the food stuffing wrapped halfway with the skin is to be pushed by said pusher mechanism, each of said rolling mechanisms comprising a fixed finger member and a pivotable finger member supported for pivotal movement between release and gripping positions, said fixed finger members of the respective rolling mechanisms cooperative with each other to support from below the food stuffing wrapped halfway with the skin when it is pushed from the shiftable table by the pusher mechanism, said pivotable finger members of the respective rolling mechanism when pivoted from the release position towards the gripping position folding the third and fourth corner portion of the skin to overlay the food stuffing, thereby leaving the second corner portion to extend outwards from the food stuffing, each of said rolling mechanisms also comprising a drive means for moving both of said fixed and pivotable finger members between projected and retracted positions in a direction towards and away from the fixed and pivotable finger members of the other rolling mechanism, and an additional drive means for pivoting the pivotable finger member between said release and gripping positions, an endless conveyor extending from below the rolling mechanisms towards a subsequent processing station for transporting a complete rolled food product, and a pair of retainer assemblies for retaining the food product through the fixed and pivotable finger members of the respective rolling mechanisms, said complete rolled food product being formed when both of the fixed and pivotable finger members of the respective rolling mechanisms are rotated by said drive means with the second corner portion being wrapped around the half wrapped food stuffing.

6. A machine as claimed in claim 5, wherein each of said retainer assemblies comprises a leaf spring having one end provided with a retainer block.

7. A machine as claimed in claim 5, wherein each of the rolling mechanisms further comprises a stopper finger member connected to said drive means for movement with the respective fixed finger member and positioned laterally of at least one of said fixed and pivotable finger members on one side adjacent the shiftable table, said stopper finger member lying in a plane at right angles to the planes of at least one of the fixed and pivotable finger members.

8. A machine as claimed in claim 5, wherein each of the rolling mechanisms further comprises a retainer finger member connected to said respective pivotable finger member for movement together therewith and positioned laterally of at least one of the fixed and pivotable finger members on one side remote from the shiftable table when the pivotable finger member is in the gripping position, said retainer finger member lying in a plane at right angles to the planes of at least one of the fixed and pivotable finger members.

9. A machine as claimed in claim 5, wherein said drive means comprises a hollow shaft supported for rotary and axial sliding movement and having one end carrying said fixed and pivotable finger members, said additional drive means comprising a drive wheel means mounted on said hollow shaft for rotary and axial sliding movement independently of the hollow shaft and a motion transmitting member extending between said drive wheel means and said associated pivotable finger member such that, when said drive wheel means is moved in one direction along the hollow shaft, said pivotable finger member is pivoted from the release position towards the gripping position, and vice versa, said drive means also comprising a geared sleeve mounted on said hollow shaft for only axial movement relative to said hollow shaft, a drive necessary to rotate said hollow shaft being transmitted from a source of drive through said geared sleeve to said hollow shaft, and further comprising a rigid shaft relatively axially movably extending through the hollow of the hollow shaft and having one end carrying an end block rigidly mounted thereon and positioned adjacent at least one of the fixed and pivotable finger members.

10. A machine for automatically making a rolled food product which comprises, in combination:

a support table for the support thereon of a generally rectangular edible skin of a type having first and second diagonally opposite corner areas and third and fourth diagonally opposite corner areas;

a rotary transport means including a plurality of equally spaced receptacles of identical construction carried thereby, said rotary transport means being supported for intermittent rotation in one direction, at least one of said receptacles being sequentially brought to a filling station and then a discharge station during each rotation of the rotary transport means;

means for shaping and supplying a food stuffing in the form of a generally elongated block onto the skin at a location on one side of the diagonal line of the shape of the skin in the first corner area thereof and for filling the food stuffing block together with the skin in one of the receptacles then held in the filling station;

a first folding means operable during the rotation of the rotary transport means with one of the receptacles moving from the filling station towards the discharge station for folding the first corner area so as to overlay the food stuffing block which is in said one of the receptacles together with the skin at said filling station, and then turn backwards in overlapping relation with a portion of the first corner area which is in contact with the food stuffing block and for folding the second corner area so as to overlay the folded and backwardly turned first corner area with a portion of the second corner area adjacent the food stuffing block held in contact with such folded and backwardly turned first corner area, thereby allowing the remaining portion of the second corner area to protrude outwards from the food stuffing block in a direction generally perpendicular to the longitudinal axis thereof and also the third and fourth corner areas to extend laterally outwards with respect to the food stuffing block;

means positioned adjacent the discharge station for receiving the food stuffing block, which has been substantially covered by the skin, and transferring it onto a rolling station;

a second folding means positioned at the rolling station for folding the third and fourth corner areas of the skin so as to overlay the food stuffing block at a position substantially opposite to the folded and backwardly turned first corner area such that the third and fourth corner areas so folded are bent to face towards each other above the food stuffing block with the remaining portion of the second corner area still protruding outwards from the food stuffing block in said direction; and a rolling means positioned at the rolling station for rolling the food stuffing block to roll up the remaining portion of the second corner area, thereby providing the rolled food product.

* * * * *